United States Patent
Srinivasa et al.

(10) Patent No.: US 10,972,337 B2
(45) Date of Patent: Apr. 6, 2021

(54) METHOD AND APPARATUS FOR SPLIT-BRAIN AVOIDANCE IN SUB-SECONDARY HIGH AVAILABILITY SYSTEMS

(71) Applicant: Versa Networks, Inc., San Jose, CA (US)

(72) Inventors: Ravikiran Keralapura Srinivasa, Bengaluru (IN); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 16/557,715

(22) Filed: Aug. 30, 2019

(65) Prior Publication Data

US 2021/0067403 A1 Mar. 4, 2021

(51) Int. Cl.
*G06F 15/173* (2006.01)
*H04L 12/24* (2006.01)
*H04L 12/26* (2006.01)
*H04L 12/801* (2013.01)

(52) U.S. Cl.
CPC ...... *H04L 41/0668* (2013.01); *H04L 43/0817* (2013.01); *H04L 43/10* (2013.01); *H04L 43/12* (2013.01); *H04L 47/11* (2013.01)

(58) Field of Classification Search
CPC . H04L 41/0668; H04L 43/0817; H04L 43/10; H04L 43/12; H04L 47/11
USPC .................................. 709/223, 224, 226, 229
See application file for complete search history.

(56) References Cited

U.S. PATENT DOCUMENTS

| | | | | |
|---|---|---|---|---|
| 2002/0150083 | A1* | 10/2002 | Fangman | H04L 29/12009 370/352 |
| 2004/0213215 | A1* | 10/2004 | Kakiuchi | H04M 15/00 370/352 |
| 2004/0215821 | A1* | 10/2004 | Regan | H04L 45/28 709/240 |
| 2018/0176073 | A1* | 6/2018 | Dubey | H04L 41/0672 |
| 2019/0089618 | A1* | 3/2019 | Kludy | G06F 11/3006 |

* cited by examiner

*Primary Examiner* — Liang Che A Wang
(74) *Attorney, Agent, or Firm* — Loza & Loza, LLP

(57) ABSTRACT

A method for providing split-brain avoidance for sub-secondary High Availability (HA) systems involves identifying the network segments that are shared by two nodes participating in HA, running the periodic network-path and next hop monitoring protocol over all these network segments, and doing the protocol over-ride to clearly detect and distinguish network and interface faults from node and service faults in HA systems. This ability is used by the Standby node to provide the split-brain avoidance without requiring any hardware bus interconnect between HA nodes or presence of any external quorum server.

12 Claims, 20 Drawing Sheets

Health Check Overload Data

907

| Tag = Crit-Service-1-Health | Length = 2 | Value = Good |
| --- | --- | --- |
| Tag = Crit-Service-2-Health | Length = 2 | Value = Good |
| Tag = HW-Resource-1-Health | Length = 2 | Value = 98.2 |
| Tag = HW-Resource-2-Health | Length = 2 | Value = Bad |
| Tag = Non-Crit-Service-1-Health | Length = 2 | Value = Overload |

| Tag = Crit-Interface-1-Health | Length = 2 | Value = Link-Up |
| --- | --- | --- |
| Tag = Crit-Route-1-Health | Length = 2 | Value = Reachable |
| Tag = Num-Of-Interfaces-Up | Length = 2 | Value = 4 |
| Tag = Num-Of-Routes-Up | Length = 2 | Value = 10 |
| Tag = Crit-Path-1-Latency | Length = 2 | Value = 15 msec |
| Tag = Crit-Path-1-Jitter | Length = 2 | Value = 3.2 |
| Tag = Crit-Path-1-Bandwidth | Length = 2 | Value = 100 Mbps |

Fig. 11

METHOD AND APPARATUS FOR SPLIT-BRAIN AVOIDANCE IN SUB-SECONDARY HIGH AVAILABILITY SYSTEMS

TECHNICAL FIELD

The embodiments herein relate to network redundancy and, more particularly, to avoiding a split-brain state between high availability network nodes.

BACKGROUND

Sub-secondary High Availability (HA) refers to a redundancy model where only two devices are employed to provide resilience from service, interface, network, and node failures in any given deployment. This model is often used in WAN-edge network elements to provide network resilience in the event of unforeseen failures in network services running on them or failures in networks serviced by them. Wide Area Network (WAN) refers to an umbrella of technologies that provide network connectivity to world-wide IP back-bone and/or other networks present in geographically different locations. A high availability (HA) cluster is said to be in split-brain state, if more than one participating HA node has taken over Mastership at any given point in time. A split-brain state on a WAN-edge can cause network malfunction, blackholing of traffic, disarming of state sync between network elements, and other network issues depending on the type and scope of deployment. In WAN-edge solutions, including Software Defined-WAN (SD-WAN) where software is the main driver for network elements, there is no hardware bus interconnect between HA nodes to detect peer node presence because the HA nodes could be located in two different places if not geographies. Further, the presence of an external Quorum server is not feasible in all deployments due to security and availability concerns.

BRIEF SUMMARY

It is an aspect of the embodiments that a method for avoiding a split-brain state for a primary high availability (HA) network node and a secondary HA network node includes the primary HA network node and the secondary HA network node forming a plurality of health check packets. The health check packets can be overloaded using protocol overload to encapsulate overload data into a packet such as an ICMP (Internet Control Message Protocol) packet or BFD (Bi-Directional Forwarding Detection packet.

The primary HA network node and the secondary HA network node can provide redundant connectivity between one or more wide area networks (WANs) and one or more local area networks (LANs). The HA network nodes can cooperatively run a redundancy protocol such as VRRP (Virtual Router Redundancy Protocol), and IGPs (Interior Gateway Protocols) such as OSPF, IS-IS, etc. The redundancy protocol may provide for the secondary HA network node assuming mastership when the primary HA network node goes down and may provide for re-routing traffic when a link (such as a LAN connection to one of the HA network nodes) goes down.

It is another aspect of the embodiments to send the health check packets on each of a plurality of routes. Each route goes from one of the HA nodes to the other. In an example where the HA network nodes provide redundant connectivity between one LAN and one WAN, the routes can include: a route from the primary HA network node to the secondary HA network node that traverses the WAN, a route from the secondary HA network node to the primary HA network node that traverses the WAN, a route from the primary HA network node to the secondary HA network node that traverses the LAN, and a route from the secondary HA network node to the primary HA network node that traverses the LAN. When there is a plurality of LANs or a plurality of WANs, the packets can be sent through additional routes such that each HA network node sends health check packets to the other HA network node on every LAN and WAN to which both are connected. In many embodiments, none of the routes traverse more than one LAN or WAN.

It is yet another aspect of the embodiments that, based on the health check packets that are received, a split-brain state can be avoided. For example, a secondary HA network node receiving a single health check packet from the primary HA network node can elect not to assume mastership and, as such, the HA nodes do not enter a split-brain state. The HA nodes enter a split-brain state when one of the nodes assumes mastership while the other HA network node has mastership.

The overload data can include one or more of: a vendor specific identifier; a critical service health metric; a hardware resource health metric; a non-critical service health metric; a critical interface health metric; a critical route health metric; and a plurality of values. The value indicating: a number of interfaces that are up; a number of routes that are up; a latency of a critical path; a jitter of the critical path; and a bandwidth of a critical path.

In general, a plurality of high availability network nodes do not enter a split-brain state when health check packets are successfully received on at least one of the LANs or WANs. Successfully receiving a health check packet from an active network node, which is a network node having mastership, can indicate no need to assume mastership by becoming an active network node.

BRIEF DESCRIPTION OF THE FIGURES

The embodiments herein will be better understood from the following detailed description with reference to the drawings, in which:

FIG. 10 illustrates an example of service and node health parameters that can be included in health check overload data, according to embodiments herein;

FIG. 11 illustrates an example of network and link health parameters that can be included in health check overload data, according to embodiments herein;

DETAILED DESCRIPTION OF EMBODIMENTS

Figure 1:
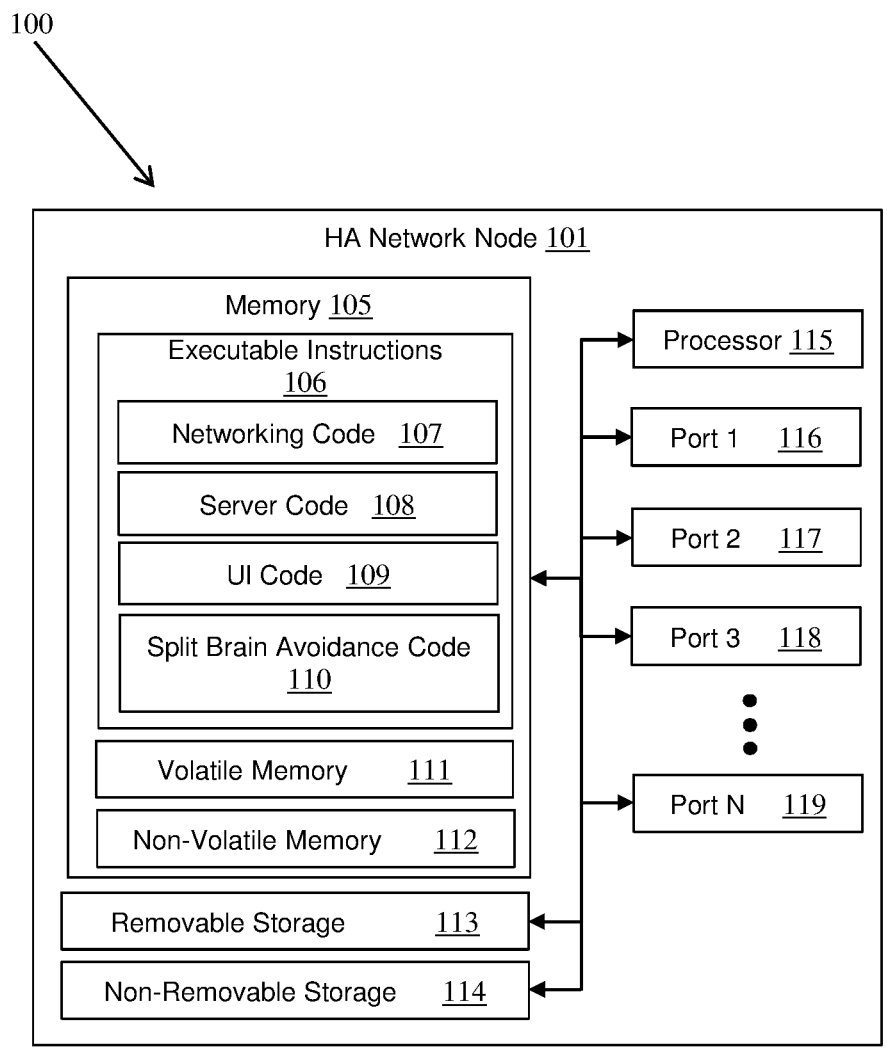
FIG. 1 is a high-level block diagram of an HA network node used to illustrate the methods disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for avoiding a split-brain state for a primary high availability (HA) network node and a secondary HA network node. In an embodiment, a hosted application can be an application (e.g., MICROSOFT OFFICE 365 OR DROPBOX) that is hosted on a server that is accessed by clients through, for example, the Internet, an intranet, a private LAN, or through a cloud, such as a public cloud, a private cloud, and/or a hybrid cloud. Further, embodiments herein are described in the context of a Software Defined Wide Area Network (SD-WAN or SDWAN). Any of the network nodes or host computers can be physical hardware or can be a virtual machine running on physical hardware. The LAN and WAN connection described herein may be virtualized as components of a virtual Software Defined Network (SDN). However, one skilled in the relevant art will recognize, in light of the description herein, that embodiments disclosed herein can be applied in non-software-defined WANs, LANs, hosts, network nodes, and applications hosted within the network, e.g., within a LAN.

Methods for avoiding a split-brain state among sub-secondary HA network nodes can use the property of local area network (LAN) network segments being required to be reachable to both HA pair nodes and availability of protocol overload to provide a way to determine and distinguish the network and link failures from service and node failures on network elements. Each HA node can encapsulate its own node health parameters, including service health, node health, link health, and network health into periodic health-check packets by using protocol-overload. The health check packets can be transmitted towards the peer HA node over each available network path between given HA pair nodes. On receiving the health-status information encoded as protocol-overload in the health check packets, the peer-node compares those values with its own values to decide if any action needs to be taken by the local node to provide service continuity. The periodic receipt or non-receipt of health check packets over the paths available between the HA network nodes is used to distinguish the node and service failures from network and link failures. If the periodic health check packets are missing over all the available paths, then it is indicative that either the active HA network node has died or it is in a state where it cannot service the traffic over any available LAN segments, thereby necessitating a mastership change. The comparison of key health parameters on HA pair nodes provides a method for proactive checking of various parameters as required by businesses to provide continuity of services without degradation in performance or availability. As protocol-overload writes beyond the payload length of the protocol packet, the method is interoperable with other vendor network elements which do not recognize the additional data at the end of the packet.

Referring now to the drawings where similar reference characters may denote corresponding features consistently throughout the figures, there are shown embodiments.

FIG. 1 is a high-level block diagram 100 of an HA network node 101 used to illustrate the methods disclosed herein. The HA network node 101 can have memory 105, removable storage 113, and non-removable storage 114. The memory 105 can be volatile memory 111 or non-volatile memory 112. Note that the removable storage 113 and the non-removable storage 114 are often considered to be non-volatile memory 112. The memory 105 can contain data and executable instructions 106. The executable instructions 106 can include computer code such as networking code 107, server code 108, user interface (UI) code 109, and split-brain avoidance code 110. A processor 115 can execute the instruction in the computer code to thereby perform a method such as a method for split-brain avoidance. The HA network node can include a large number of ports 116, 117, 118, 119 for communicatively coupling the HA network node to LANs and WANs. The ports 116, 117, 118, 119 can be directly controlled by the processor 115 or by a communications subsystem that is controlled by the processor 115.

Figure 2:
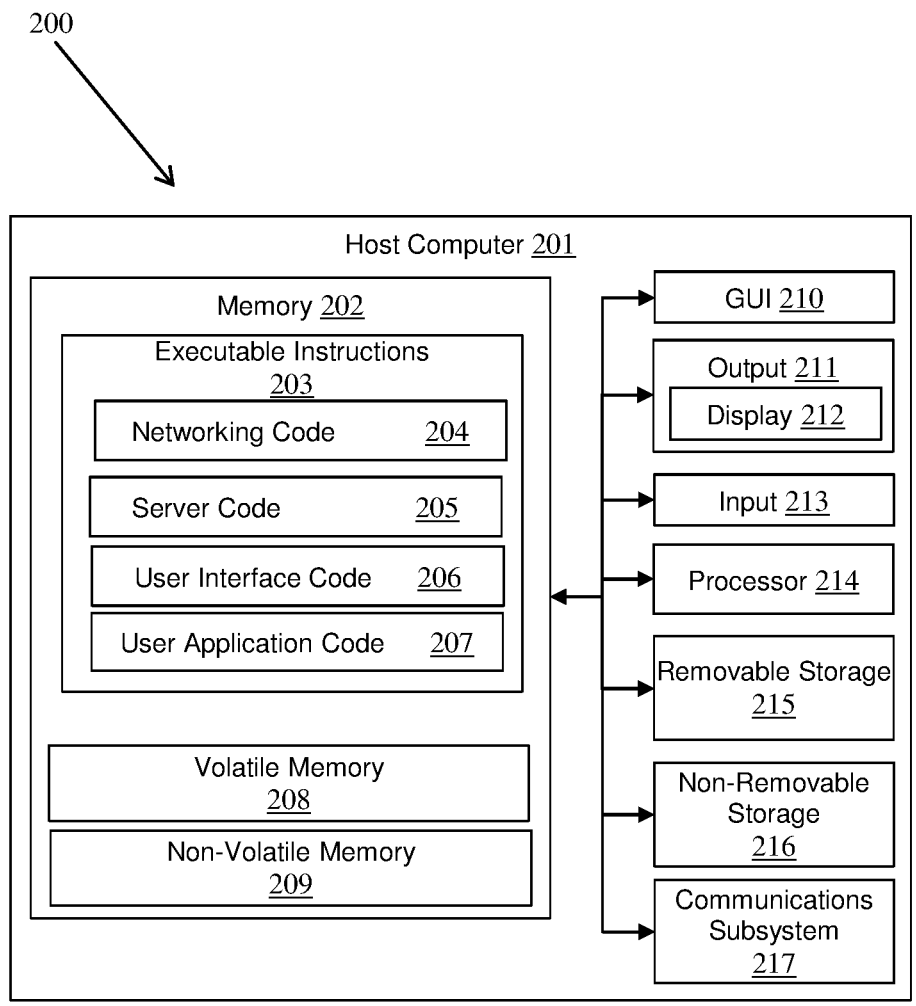
FIG. 2 is a high-level block diagram of a host computer, according to embodiments herein.

FIG. 2 is a high-level block diagram 200 of a host computer 201, according to embodiments herein. A computing device in the form of a computer 201 configured to interface with controllers, peripheral devices, and other elements disclosed herein may include one or more processing units 214, memory 202, removable storage 215, and non-removable storage 216. Memory 202 may include volatile memory 208 and non-volatile memory 209. Computer 201 may include or have access to a computing environment that includes a variety of transitory and non-transitory computer-readable media such as volatile memory 208 and non-volatile memory 209, removable storage 215 and non-removable storage 216. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Host computer 201 may include, or have access to, a computing environment that includes input 213, output 211, and a communications subsystem 217. The computer 201 may operate in a networked environment using a communications subsystem 217 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a LAN, a WAN, Bluetooth connection, or other networks.

Output 211 is most commonly provided as a computer monitor, but may include any output device. Output 211 and/or input 213 may include a data collection apparatus associated with computer system 201. In addition, input 213, which commonly includes a computer keyboard and/or pointing device such as a computer mouse, computer track pad, touch screen, or the like, allows a user to select and instruct computer system 201. A user interface can be provided using output 211 and input 213. Output 211 may include a display 212 for displaying data and information for a user, or for interactively displaying a GUI (graphical user interface) 210. A GUI is typically responsive of user inputs entered through input 213 and typically displays images and data on display 212.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 213 such as, for example, a pointing device such as a mouse, and/or with a keyboard. A particular item can function in the same manner to the user in all applications because the GUI provides standard software routines (e.g., program code in executable instructions 203 can include such software routines) to handle these elements and report the user's actions.

Computer-readable instructions, for example, program code in executable instructions 203, which can include or be representative of software routines, software subroutines, software objects, nodes, etc. described herein, are stored on a computer-readable medium and are executable by the processor device (also called a processing unit) 214 of computer 201. Executable instructions 203 may include a computer application. A hard drive, CD-ROM, RAM, Flash Memory, and a USB drive are just some examples of articles including a computer-readable medium. The executable instructions 203 of FIG. 2 are not illustrated as including split-brain avoidance code because the host computers 415, 416, 417, 418 could have no such code. If the computer 201 is acting as an HA network node, then the host computer can have split-brain avoidance code. The host computer 201 can be a physical host running a virtual machine instance of a HA network node 101.

Figure 3:
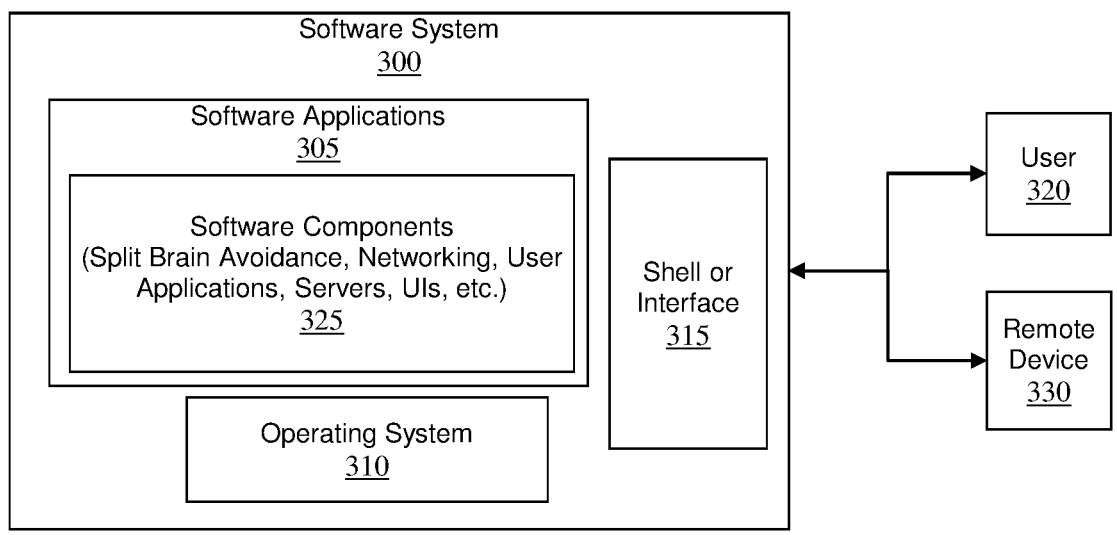
FIG. 3 is a high-level block diagram of a software system, according to embodiments herein.

FIG. 3 is a high-level block diagram of a software system 300, according to embodiments herein. FIG. 3 illustrates a software system 300, which may be employed for directing the operation of the data-processing systems such as computer system 201 or HA network node 101. Software application 305, may be stored in memory 105, 202, on removable storage 113, 215, or on non-removable storage 114, 216, and generally includes and/or is associated with a kernel or operating system 310 and a shell or interface 315. One or more application programs may be "loaded" (i.e., transferred from removable storage 113, 215 or non-removable storage 114, 216 into the memory 105, 202) for execution by the data-processing system 101, 201. The application program 305 can include software components 325 such as software modules, software subroutines, software objects, network code, server code, UI code, split-brain avoidance code, etc. The data-processing system 101, 201 can receive user commands and data through interface 315, which can include input 213, output 211, and communications connections 116-119, 217 accessible by a user 320 or remote device 330. These inputs may then be acted upon by the computer system 101, 201 in accordance with instructions from operating system 310 and/or software application 305 and any software components 325 thereof.

Generally, software components 325 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only to within the application or component) and which includes source code that actually implements the routines in the application or component. The terms application or component may also simply refer to an application such as a computer program designed to assist in the performance of a specific task such as word processing, accounting, inventory management.

Components can be built or realized as special purpose hardware components designed to equivalently assist in the performance of a task.

The interface 315 can include a graphical user interface 210 that can display results, whereupon a user 320 or remote device 330 may supply additional inputs or terminate a particular session. In some embodiments, operating system 310 and GUI 210 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, software components 325, which can include instructions for carrying out steps or logical operations such as those shown and described herein.

The description herein is presented with respect to embodiments that can be embodied in the context of, or require the use of, a data-processing system such as computer system 101, 201, in conjunction with program code in an application module in memory 105, 202, software system 300, or data-processing system 101, 201. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Computer systems 101, 201 and software systems can take the form of or run as virtual machines (VMs) or containers that run on physical machines. A VM or container typically supplies an operating environment, appearing to be an operating system, to program code in an application module and software applications 305 running in the VM or container. A single physical computer can run a collection of VMs and containers. In fact, the entire network data processing system including HA network node 101, computer host 201, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 4:
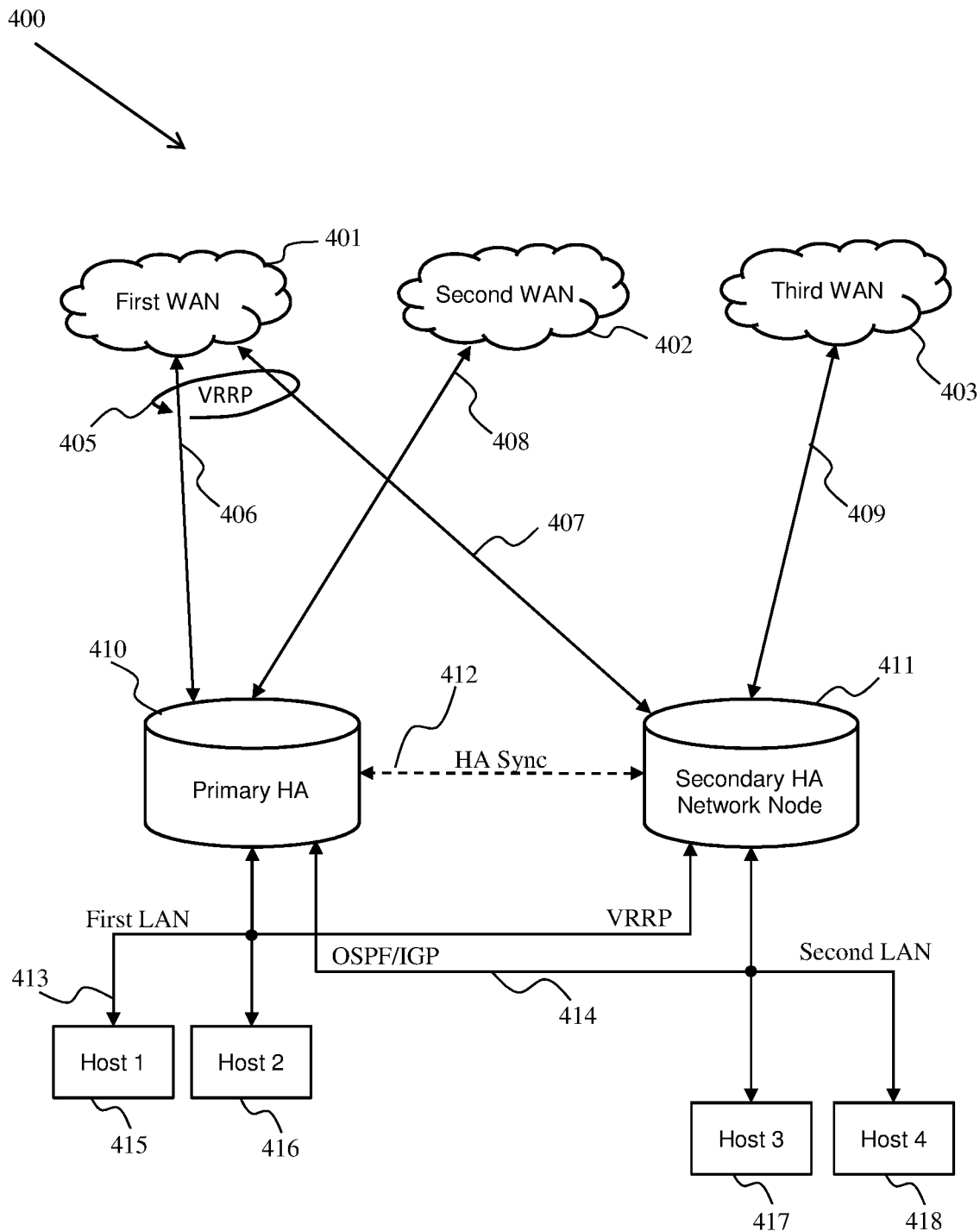
FIG. 4 depicts a network with sub-secondary HA systems and all links functioning, according to embodiments herein.

FIG. 4 depicts a network 400 with sub-secondary HA systems 410, 411 and all links functioning, according to embodiments herein. The primary HA network node 410 provides connectivity between a first LAN 413, a second LAN 414, a first WAN 401, and a second WAN 402. The secondary HA network node 411 provides connectivity between the first LAN 413, the second LAN 414, the first WAN 401, and a third WAN 403. As shown, the HA network nodes 410, 411 provide redundant connectivity between the first LAN 413, the second LAN 414, and the first WAN 401.

The primary-first WAN link 406 and the secondary-first WAN link 407 are associated using VRRP to thereby manage the redundant connection between the first WAN 401 and the LANs 413, 414. Similarly, VRRP on the LANs 413, 414 can ensure that the hosts 415, 416, 417, 418 send packets to an appropriate upstream gateway 410, 411.

Here, the HA network nodes are cooperatively running VRRP. Computers, such as HA network nodes, can cooperatively run a protocol by being configured to participate in an activity defined by that protocol. For example, a set of routers using VRRP can automatically and dynamically assign virtual media access addresses (vMACs) to specific routers such that packets sent to a specific vMAC automatically go to a specific one of the routers. As such, the routers can cooperatively adjust routes by reassigning vMACs.

It is important to note that there is no quorum server monitoring the HA network nodes 410, 411. Two non-redundant links 408, 409 are shown. Primary-second WAN link 408 can pass traffic between the primary HA network node 410 and the second WAN 402. Secondary-third WAN link 409 can pass traffic between the secondary HA network node 411 and the third WAN 403.

The network 400 involves 2 Physical WAN-edge network elements 410, 411 servicing one or more LAN network segments 413, 414 on the south-bound interfaces and servicing one or more WAN transports 406, 407, 408, 409 on the north-bound interfaces. The outbound traffic from a given LAN network segment could be channeled towards the Active node in the HA cluster using either Virtual Router Redundancy Protocol (VRRP) or any Interior Gateway Protocols (IGP) like OSPF, IS-IS. The choice of WAN transport for routing and/or forwarding the LAN traffic in network elements could be driven by configured network policies and/or load-balancing criteria chosen.

HA sync channel 412 illustrates the use of the network for synchronization of information between HA pair nodes to provide the continued network service in the event of any failure. The HA sync channel could be a dedicated network link/path or it could be riding over one or more of the LAN/WAN segments connected to both HA pair nodes. As the HA pair nodes need to provide resilience to all the LAN segments, both will have to be connected to each LAN segment to be serviced. Hence, by virtue they would be reachable to each other on each LAN segment serviced by given HA pair. On WAN transports however, they may or may not share a given WAN transport.

As discussed above, in WAN-edge solutions, including SD-WAN where software is the main driver for network element, there is no hardware bus interconnect between HA nodes to detect presence of peer node because the HA nodes could be located in two different places if not geographies. Further, the presence of an external Quorum server is not feasible in all deployments due to security and availability concerns. The network 400 of FIG. 4 being just such a deployment, the HA sync channel 412 is illustrated as a dashed line to indicate that it is either non-functioning or non-existent. The HA sync functionality can be provided by the methods described herein.

The solid lines 406, 407, 413, 414 illustrate the network paths on which periodic network health-check probes are exchanged between HA pair nodes. Compound lines 408 and 409 indicate network paths that do not provide connectivity between the HA pair nodes 410, 411. ICMP and BFD are widely used for the periodic health-check probes on network appliances.

The protocol-overload refers to piggy-backing (adding) at the end of protocol payload, some data such that the network devices unaware of such data addition (piggy-backing) continue to work without problems. Whereas, the network devices that are aware of such data addition can use the additional data to provide the enhanced functionality, like in this case to facilitate split-brain avoidance. Using the protocol-overload ensures interoperability in multi-vendor, heterogenous networks where network elements from different vendors must coexist.

Figure 5:
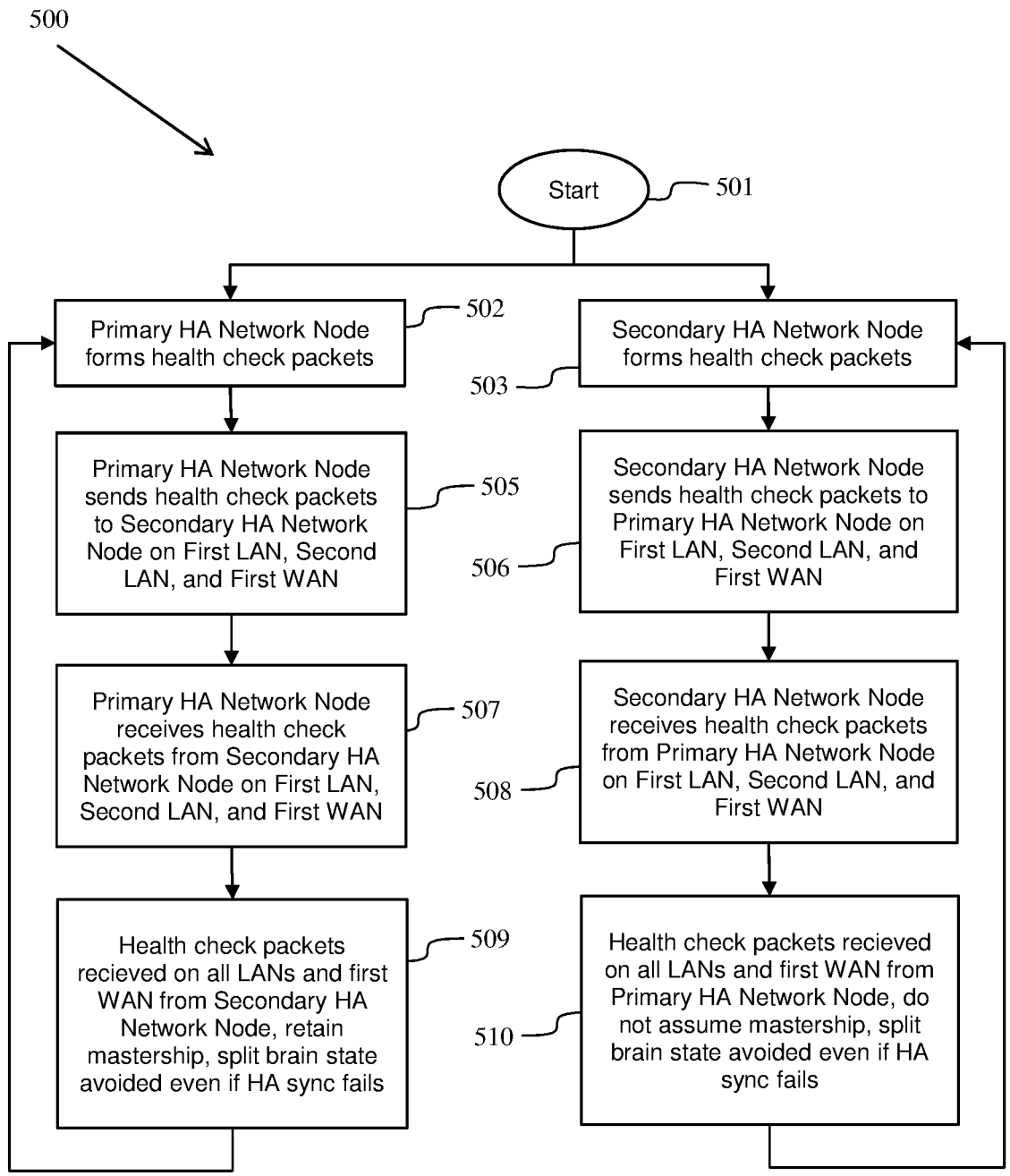
FIG. 5 is a flow chart illustrating an example of a method for split brain avoidance in relation to the network of FIG. 4, according to embodiments herein.

FIG. 5 is a flow chart illustrating an example of a method for split brain avoidance 500 in relation to the network of FIG. 4, according to embodiments herein. After the start 501 both the HA network nodes 410, 411 begin forming health check packets 502, 503 and sending them to one another on each of the available shared networks 505, 506—those shared networks being the first LAN 413, the second LAN 414, and the first WAN 401.

The HA network nodes 410, 411 successfully receive health check packets from the other HA network node on the first LAN, on the second LAN, and on the first WAN 507, 508. Here, all three shared networks are fully functional and packets are successfully received on all three shared networks. A split-brain state is avoided 509, 510 because health check packets are received by each HA network node and the secondary HA network node does not assume mastership and does not become the active HA network node.

Examples of overloaded health check packets, specifically overloaded ICMP packets and Bi-Directional Forwarding Detection (BFD) packets, are provided below. ICMP and BFD are two of the network protocols that support inter-operable overload. A network protocol supports inter-operable overload when overloading a packet does not break interoperability. Interoperability is unbroken when intermediate network nodes forward overloaded packets from source to destination as they would non-overloaded packets even when some intermediate network nodes are unaware of the format or purpose of the overload data.

Those practiced in the art of computer networking are familiar with ICMP and BFD packets that have not been overloaded. Here, the packets have been augmented to become overloaded health check packets that include health check overload data to thereby facilitate the system and methods described herein.

Figure 6:
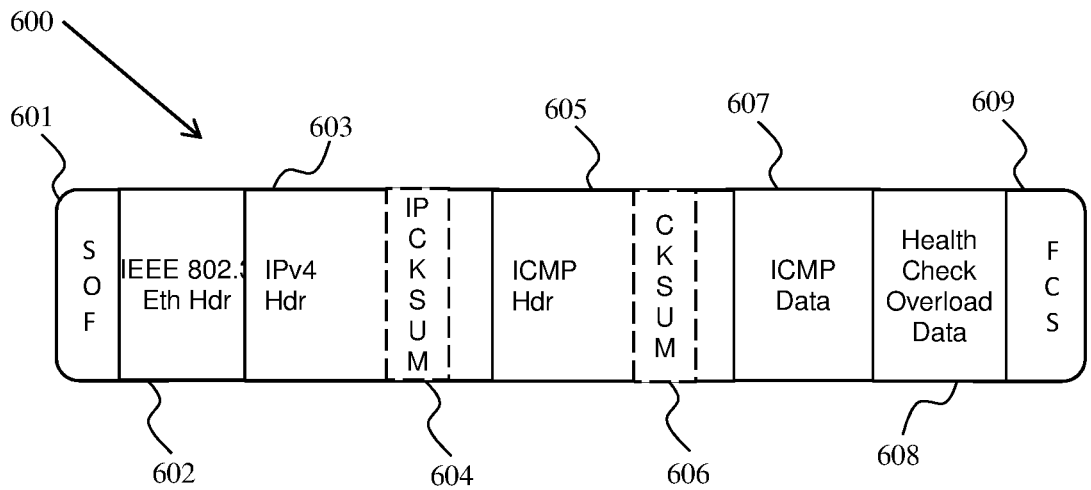
FIG. 6 illustrates an example of an IPv4 ICMP network packet that is overloaded with health check data, according to embodiments herein.

FIG. 6 illustrates an example of an IPv4 ICMP network packet 600 that is overloaded with health check data, according to embodiments herein. The packet begins with a start of frame (SOF) 601 section and ends with a frame check sequence (FCS) section 609. Immediately following the SOF 601 is the IEEE 802.3 ethernet header 602 and the IPv4 header 603. The IPv4 header contains a checksum 604. Next is an ICMP header 605 and ICMP data 607. The ICMP header 605 has its own checksum 606. Overload data 608 has been included between the ICMP data 607 and the FCS 609. Here, the overload data is health check overload data 608 as will be described below.

Figure 7:
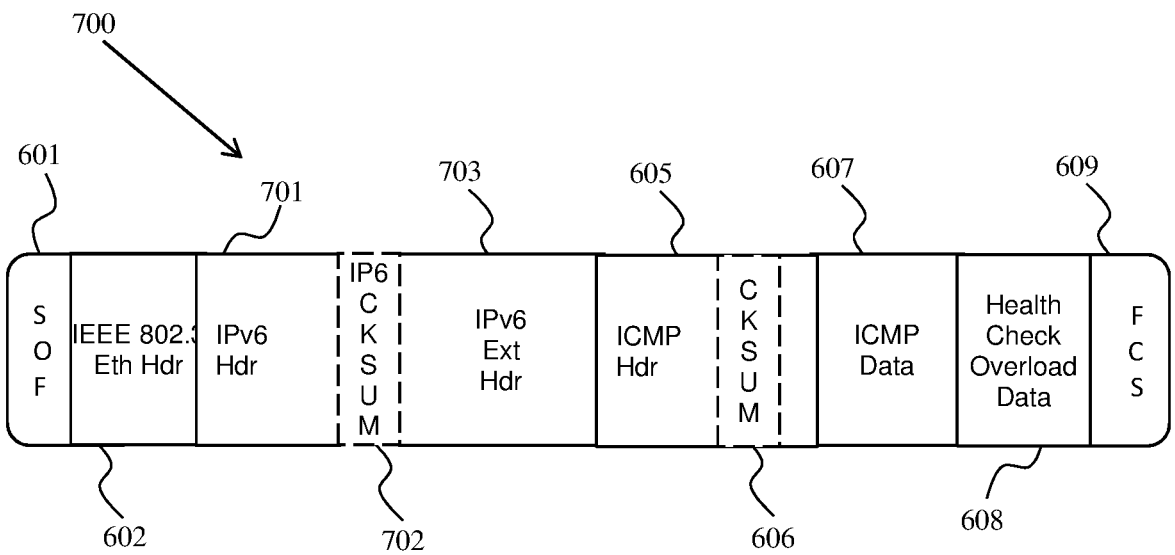
FIG. 7 illustrates an example of an IPv6 ICMP network packet that is overloaded with health check data, according to embodiments herein.

FIG. 7 illustrates an example of an IPv6 ICMP network packet 700 that is overloaded with health check data, according to embodiments herein. The overloaded IPv6 ICMP packet is similar to the overloaded IPv4 excepting that the IPv4 header 603 and checksum 604 are instead an IPv6 header 701 and checksum 702. An IPv6 extension header 703 is between the IPv6 header 701 and the ICMP header 605.

Figure 8:
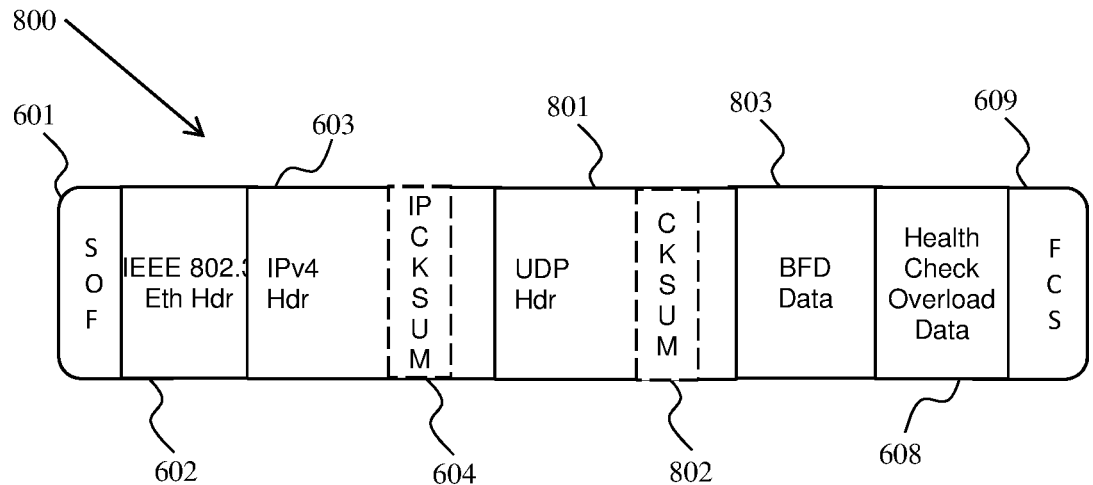
FIG. 8 illustrates an example of an IPv4 BFD network packet that is overloaded with health check data, according to embodiments herein.

FIG. 8 illustrates an example of an IPv4 BFD network packet 800 that is overloaded with health check data, according to embodiments herein. The packet begins with a start of frame (SOF) 601 section and ends with a frame check sequence (FCS) section 609. Immediately following the SOF 601 is the IEEE 802.3 ethernet header 602 and the IPv4 header 603. The IPv4 header contains a checksum 604. Next is a user datagram protocol (UDP) header 801 and BFD data 803. The UDP header 801 has its own checksum 802. Overload data 608 has been included between the BFD data 803 and the FCS 609. The overload data is health check overload data 608 as will be described below.

The split-brain avoidance methods described herein can use a protocol-overload mechanism to carry the vendor specific data piggy-backed on health-check probes such as ICMP packets, and BFD packets to thereby exchange information among HA pair nodes. The exchanged information can contain: an HA-pair identifier that can identify HA-pairs when a given network segment has overlap in HA-pairs servicing it; service and node health parameters indicating the health-status of a peer node so that a given HA node can determine the action to be taken based on configured policies; network and link health parameters that indicate the ability of a given HA node to service certain network segments and to determine any actions to be taken based on configured policies; and any other information that can be used to identify which among the HA pair nodes is better suited to take up the Master/Active role and provide services.

Figure 9:
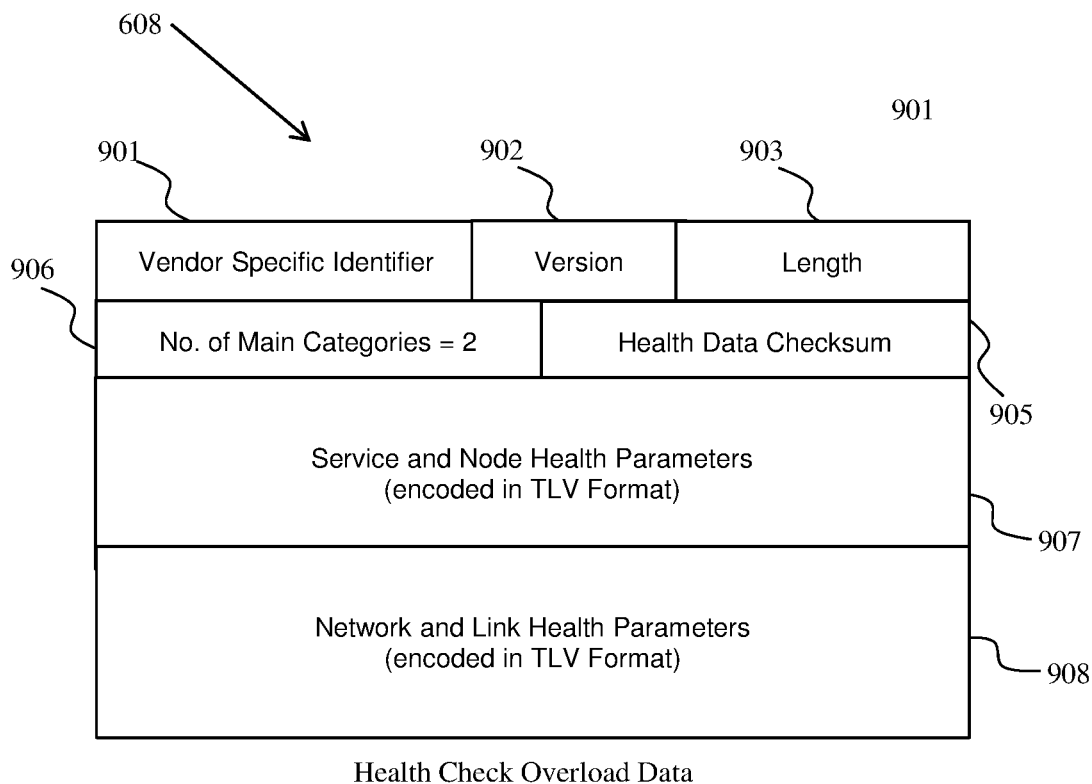
FIG. 9 illustrates an example of the health check overload data that can be carried in an overloaded network packet, according to embodiments herein.

FIG. 9 illustrates an example of the health check overload data 608 that can be carried in an overloaded network packet, according to embodiments herein. The health check overload data begins with a vendor specific identifier 901 followed by a version number 902, length 903, number of main categories 906, and health data checksum 905. Two blocks of health data 907, 908 follow the health data checksum 905. An implementation can have a two-byte vendor specific identifier 901, one-byte version number 902, one-byte length field 903, two-byte number of main categories 906, and two-byte health data checksum 905. The number of main categories is shown having the value of two, which is the number of blocks of health data.

FIG. 10 illustrates an example of service and node health parameters that can be included in health check overload data 608, according to embodiments herein. The first health check data block 907 is illustrated as having service and node health parameters encoded in tag-length-value (TLV) format. There are five parameters shown. The health of a first critical service (Crit-Service-1-Health) is shown to be "Good". The length field indicating the length of the value field and can be in bits, bytes, words, etc. The value field can be encoded as a binary or Boolean flag (e.g. "Good"=1, "Bad"=0), as a floating-point number, an integer, a scaled integer, or a sequence of characters (e.g. "Good"). Continuing through the service and node health parameters, the health of a second critical service (Crit-Service-2-Health) is shown to be "Good". The health of a first hardware resource (HW-Resource-1-Health) is shown to be "98.2". The health of a second hardware resource (HW-Resource-1-Health) is shown to be "Bad". The health of a first non-critical service (Non-Crit-Service-1-Health) is shown to be "Overload".

FIG. 11 illustrates an example of network and link health parameters that can be included in health check overload data 608, according to embodiments herein. The second health check data block 908 is illustrated as having network and link health parameters encoded in TLV format. There are seven parameters shown. The health of a first critical interface (Crit-Interface-1-Health) is shown to be "Link-Up". The health of a first critical route (Crit-Route-1-Health) is shown to be "Reachable". The number of interfaces that are up (Num-Of-Interfaces-Up) is shown to be "4". The number of routes that are up (Num-Of-Routes-Up) is shown to be "10". The latency of a first critical path (Crit-Path-1-Latency) is shown to be "15 msec". The jitter of the first critical path (Crit-Path-1-Jitter) is shown to be "3.2". The bandwidth of the first critical path (Crit-Path-1-Bandwidth) is shown to be "100 Mbps".

Figure 12:
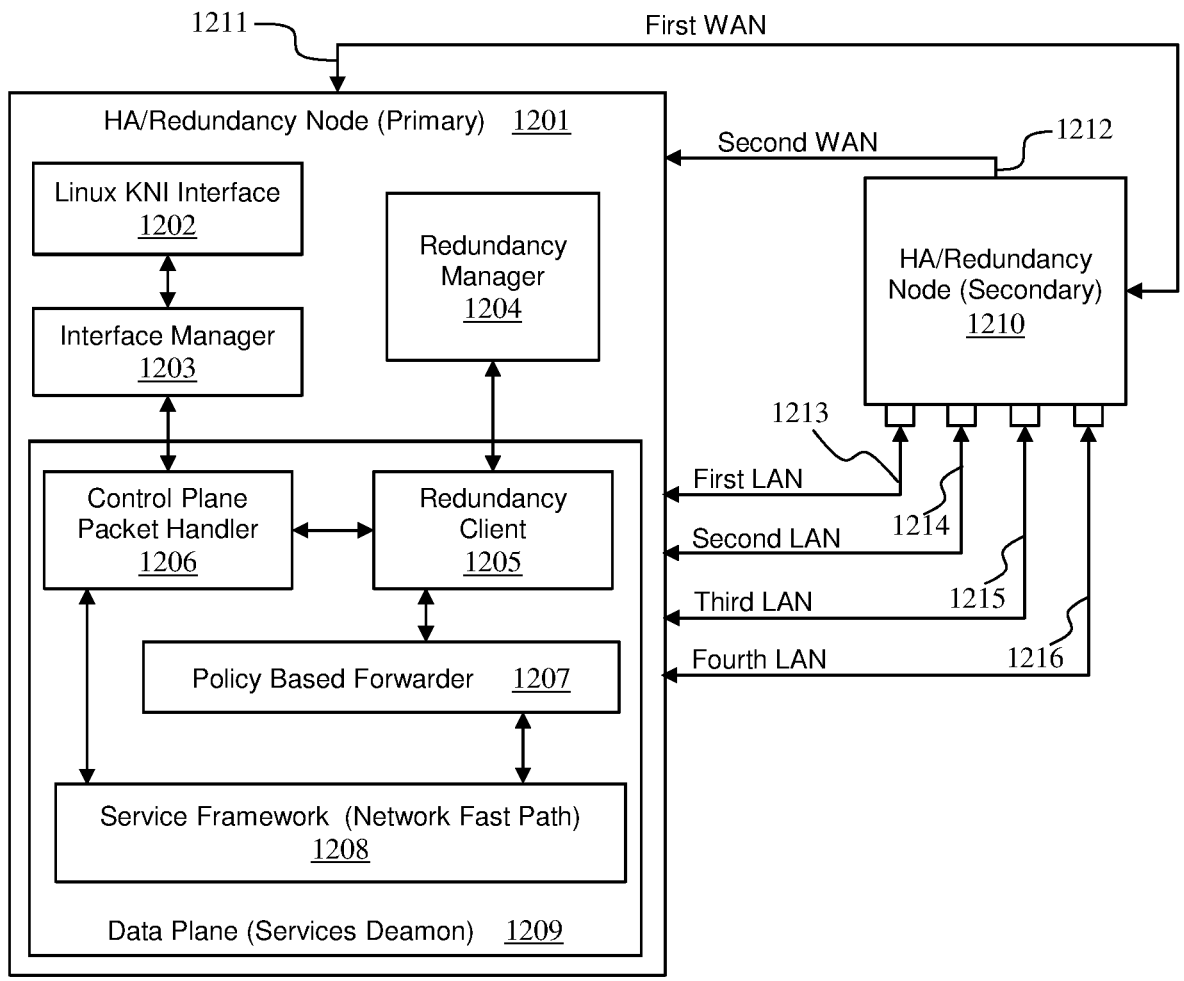
FIG. 12 illustrates an example of health check components in a Linux environment, according to embodiments herein.

FIG. 12 illustrates an example of health check components in a Linux environment, according to embodiments herein. A primary HA/Redundancy node 1201 is detailed. A secondary HA/Redundancy node 1210 can be the same, internally, as the primary HA/Redundancy node 1201. A Linux Kernel NIC Interface 1202 communicates with an interface manager 1203 that communicates with a control plane packet handler 1206 inside a data plane 1209 that can be a services daemon run by the Linux system. A redundancy manager 1204 can communicate with a redundancy client 1205 inside the data plane 1209.

Inside the data plane 1209, the control plane packet handler 1206 communicates with the redundancy client 1205 and a service framework 1208 (which can be a network fast path). The redundancy client 1205 can communicate with a policy-based forwarder 1207 that communicates with the service framework 1208. The primary HA/Redundancy node 1201 and secondary HA/Redundancy node 1210 can communicate with one another on a first LAN 1213, a second LAN 1214, a third LAN 1215, a fourth LAN 1216, a first WAN 1211, and a second WAN 1212.

Figure 13:
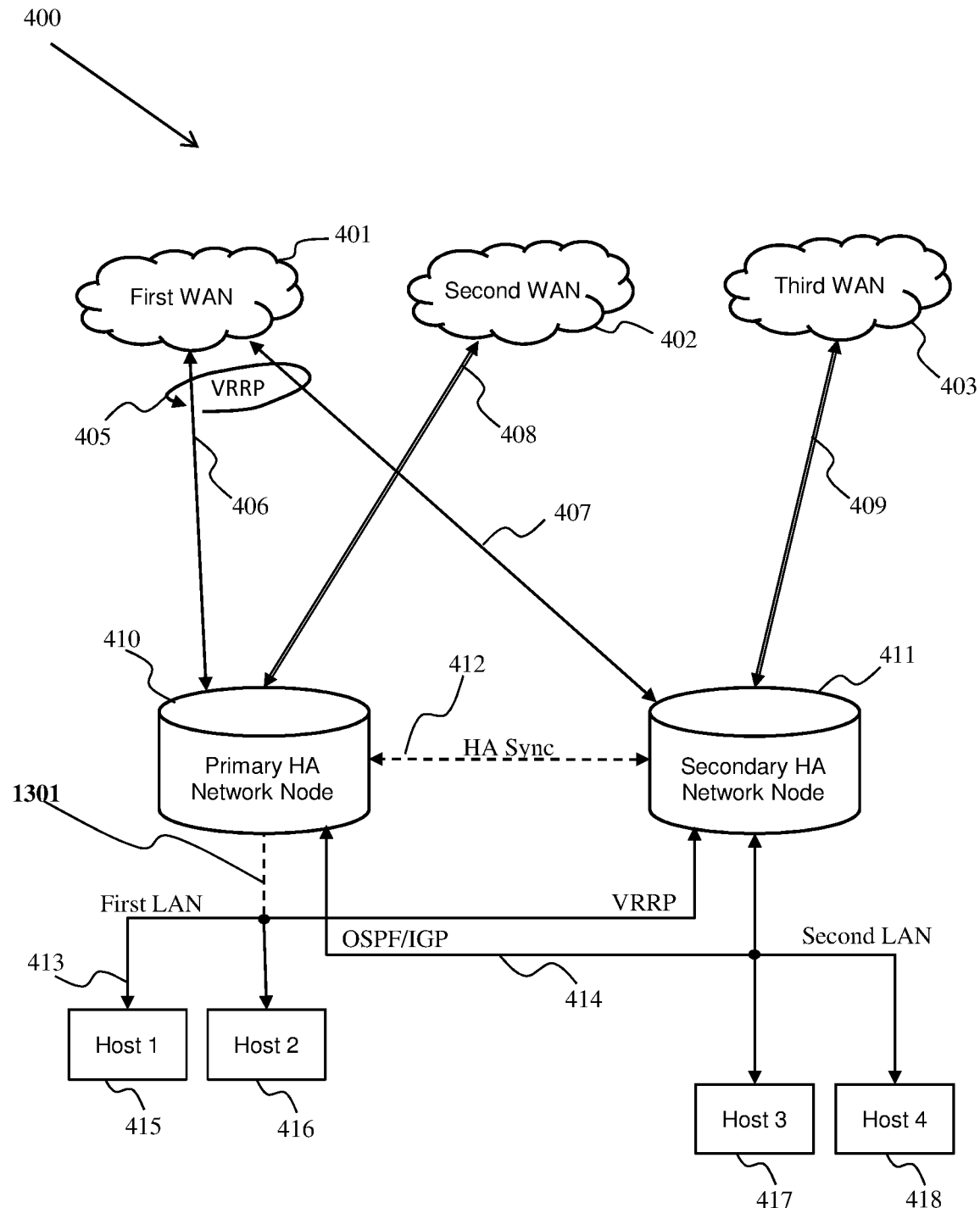
FIG. 13 illustrates the network of FIG. 4 with a link failure wherein the primary HA network node is unable to transmit to the first LAN, according to embodiments herein.

FIG. 13 illustrates the network 400 of FIG. 4 with a link failure 1301 wherein the primary HA network node is unable to transmit to the first LAN, according to embodiments herein. The link failure 1301 is shown as a dashed line on the Active node (primary HA network node) of the HA pair. Except for the failed segment, the periodic health-check probes continue to flow on all other available LAN and WAN paths between the HA pair. As long as there is a single network path over which the HA nodes are able to reach each other, the split-brain is avoided. Enabling VRRP or IGP over the LAN segments ensures that the north-south traffic converges on the Standby network element (secondary HA network node), which in-turn can either choose to hand-over the traffic to Active over the remaining links or it may choose to forward the traffic to its own LAN or WAN links, depending on the network functions/services enabled on given WAN-edge network element.

Figure 14:
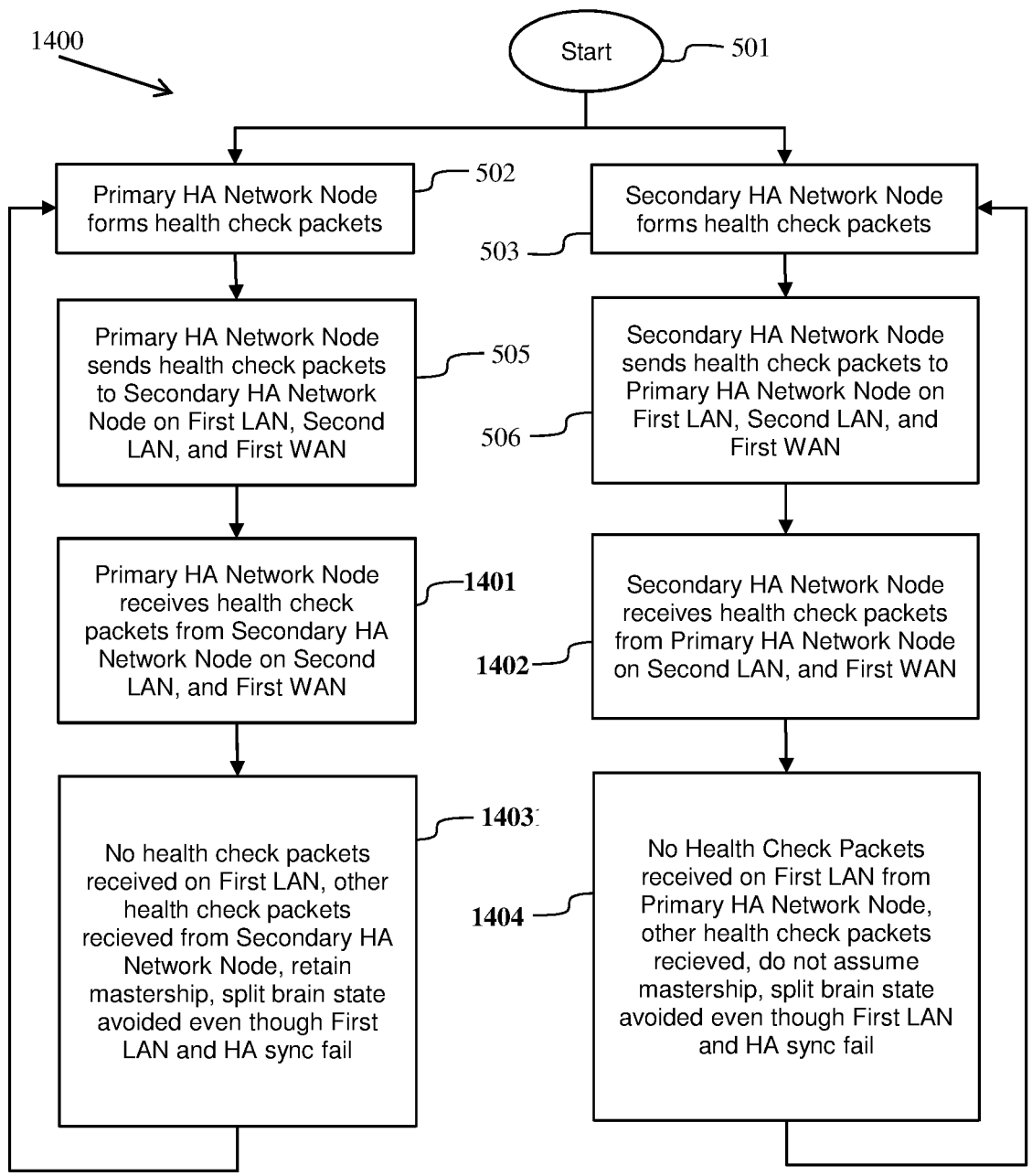
FIG. 14 illustrates the method of FIG. 5 avoiding a split-brain state in relation to the network of FIG. 13, according to embodiments herein.

FIG. 14 illustrates the method of FIG. 5 avoiding a split-brain state in relation to the network of FIG. 13, according to embodiments herein. Method steps 501, 502, 503, 505, and 506 are unchanged from those of FIG. 5. The HA network nodes receive health check packets only on the second LAN and first WAN 1401, 1402. A split-brain state is avoided because health check packets are received by both HA network nodes 1403, 1404. The secondary HA network node does not assume mastership, thereby avoiding a split-brain state.

Figure 15:
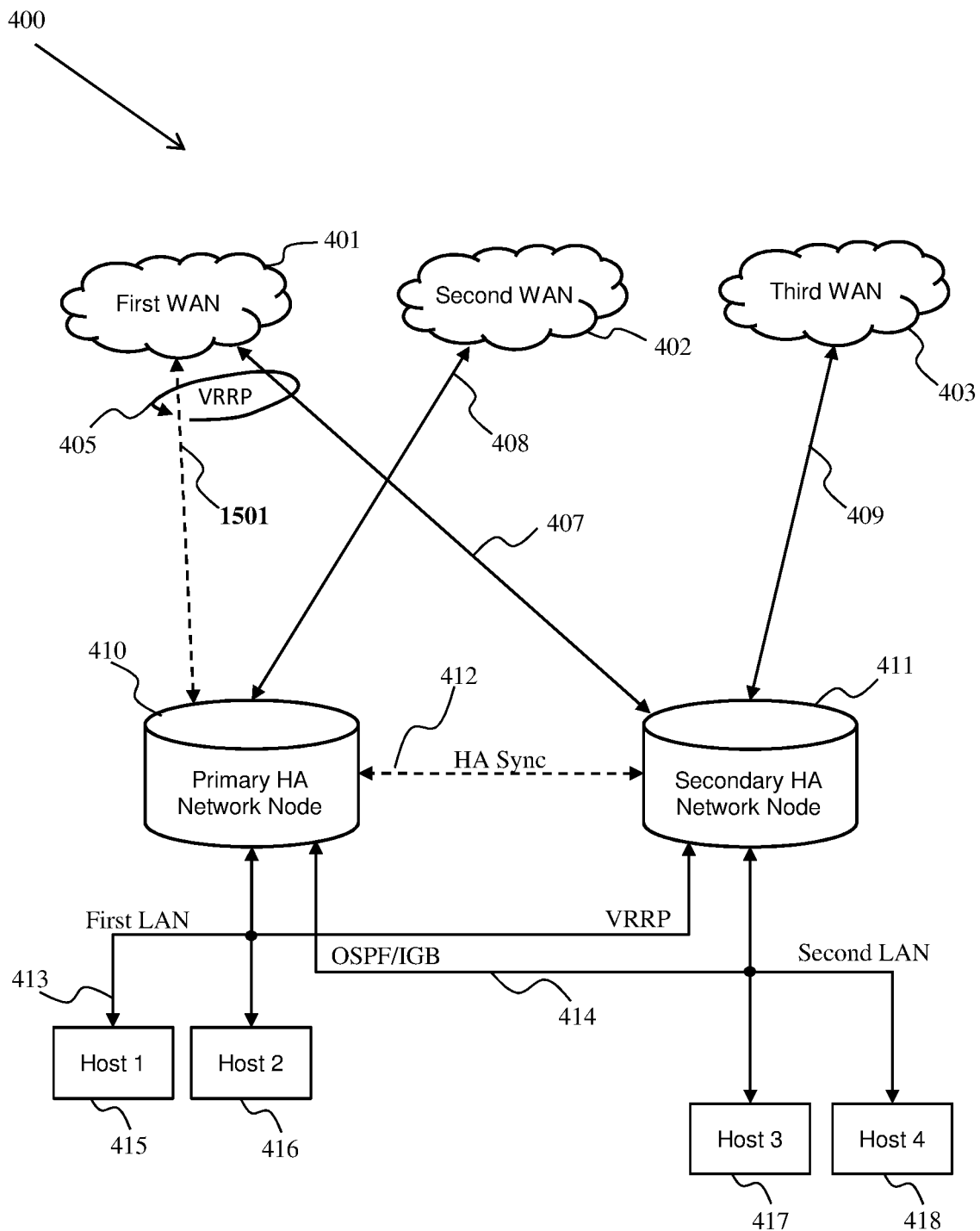
FIG. 15 illustrates the network of FIG. 4 with a link failure wherein the primary HA network node is unable to transmit to the first WAN, according to embodiments herein.

FIG. 15 illustrates the network of FIG. 4 with a link failure 1501 wherein the primary HA network node is unable to transmit to the first WAN, according to embodiments herein. The link failure 1501 is shown as a dashed line between the first WAN 401 and the primary HA network node 410 which, currently having mastership, is the Active node of the HA pair. Except for the failed segment, the periodic health-check probes continue to flow on all other available LAN and WAN paths between the HA pair. As long as there is a single network path over which the HA nodes are able to reach each other, the split-brain is avoided. Enabling VRRP or e-BGP over the WAN segments ensures that the north-south traffic converges on the Standby network element (secondary HA network node), which in-turn can either choose to hand-over the traffic to Active over the remaining links or it may choose to forward the traffic to its own LAN or WAN links, depending on the network functions/services enabled on given WAN-edge network element. Alternatively, it could choose to initiate a master change depending on how critical the failed WAN transport link is for the deployment.

Figure 16:
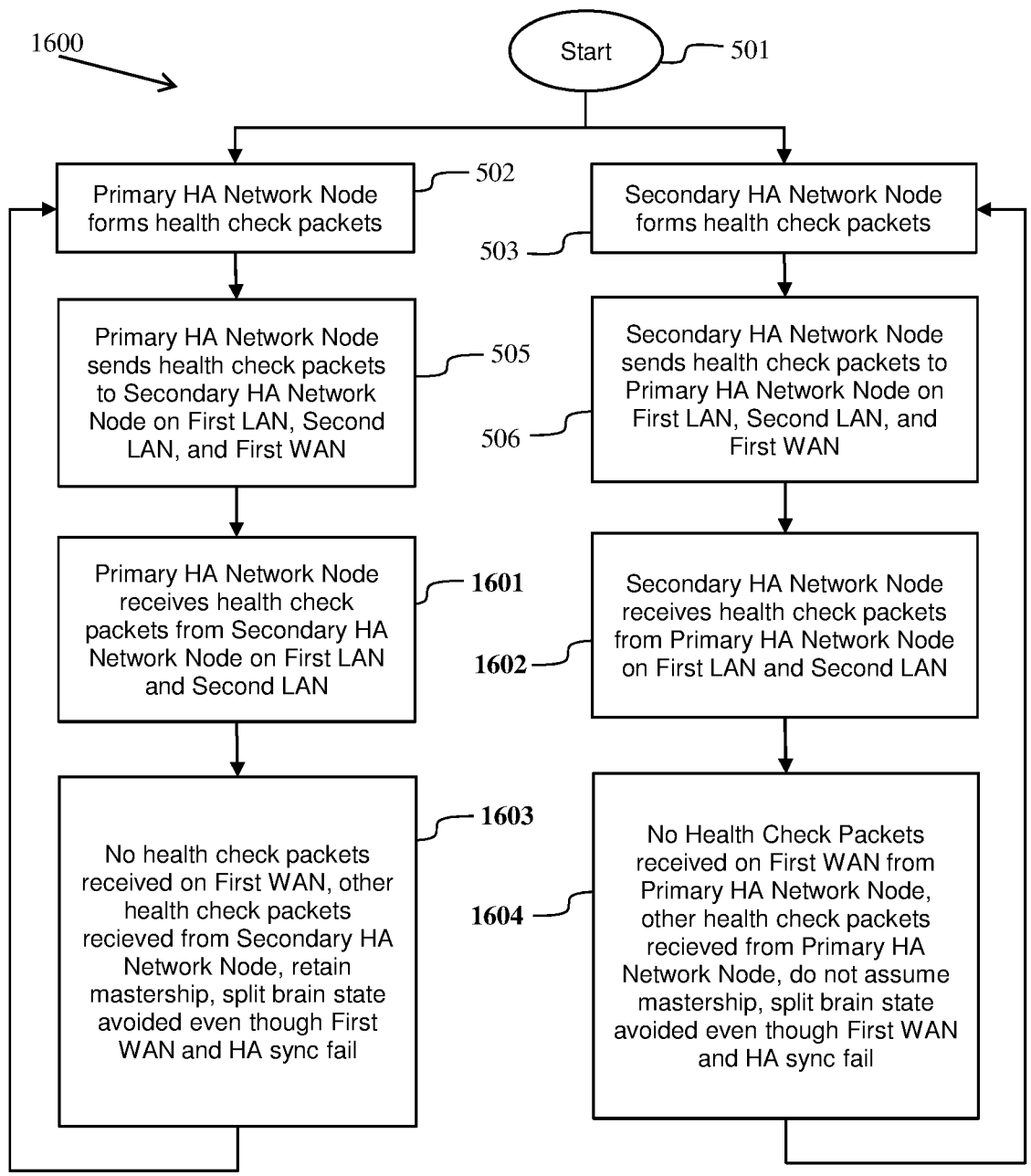
FIG. 16 illustrates the method of FIG. 5 avoiding a split-brain state in relation to the network of FIG. 15, according to embodiments herein.

FIG. 16 illustrates the method of FIG. 5 avoiding a split-brain state in relation to the network of FIG. 15, according to embodiments herein. Method steps 501, 502, 503, 505, and 506 are unchanged from those of FIG. 5. The HA network nodes receive health check packets only on the first LAN and the second LAN 1601, 1602. A split-brain state is avoided because health check packets are received by both HA network nodes 1603, 1604. The secondary HA network node does not assume mastership.

Figure 17:
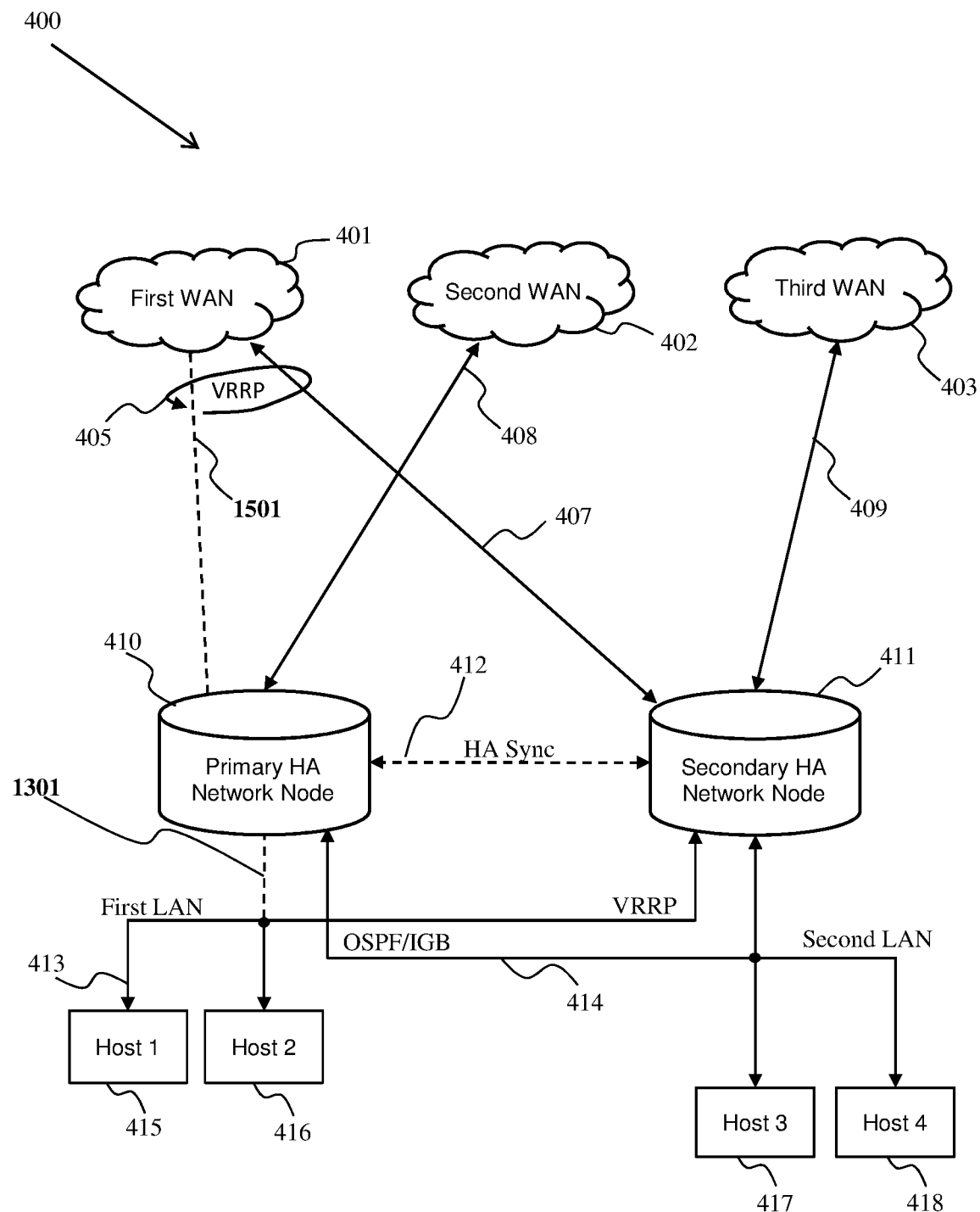
FIG. 17 illustrates the network of FIG. 4 with link failures wherein the primary HA network node is unable to transmit to the first WAN or to the first LAN, according to embodiments herein.

FIG. 17 illustrates the network of FIG. 4 with link failures 1301,1501 wherein the primary HA network node is unable to transmit to the first WAN or to the first LAN, according to embodiments herein. The link failures 1301, 1501 are shown as dashed lines to the primary HA network node. The primary network node 410, having mastership, is the Active node of the HA pair. Except for the failed segments, the periodic health-check probes continue to flow on all other available LAN and WAN paths between the HA pair. As long as there is a single network path over which the HA nodes are able to reach each other, the split-brain is avoided. Enabling VRRP or IGP over the LAN segments ensures that the north-south traffic converges on Standby router (secondary HA network node). Enabling VRRP or e-BGP over the WAN segments ensures that the north-south traffic converges on the Standby network element (secondary HA network node), which in-turn can either choose to hand-over the traffic to Active over the remaining links or it may choose to forward the traffic to its own LAN or WAN links, depending on the network functions/services enabled on given WAN-edge network element. Alternatively, it could choose to initiate a master change depending on how critical the failed WAN transport link is for the deployment.

Figure 18:
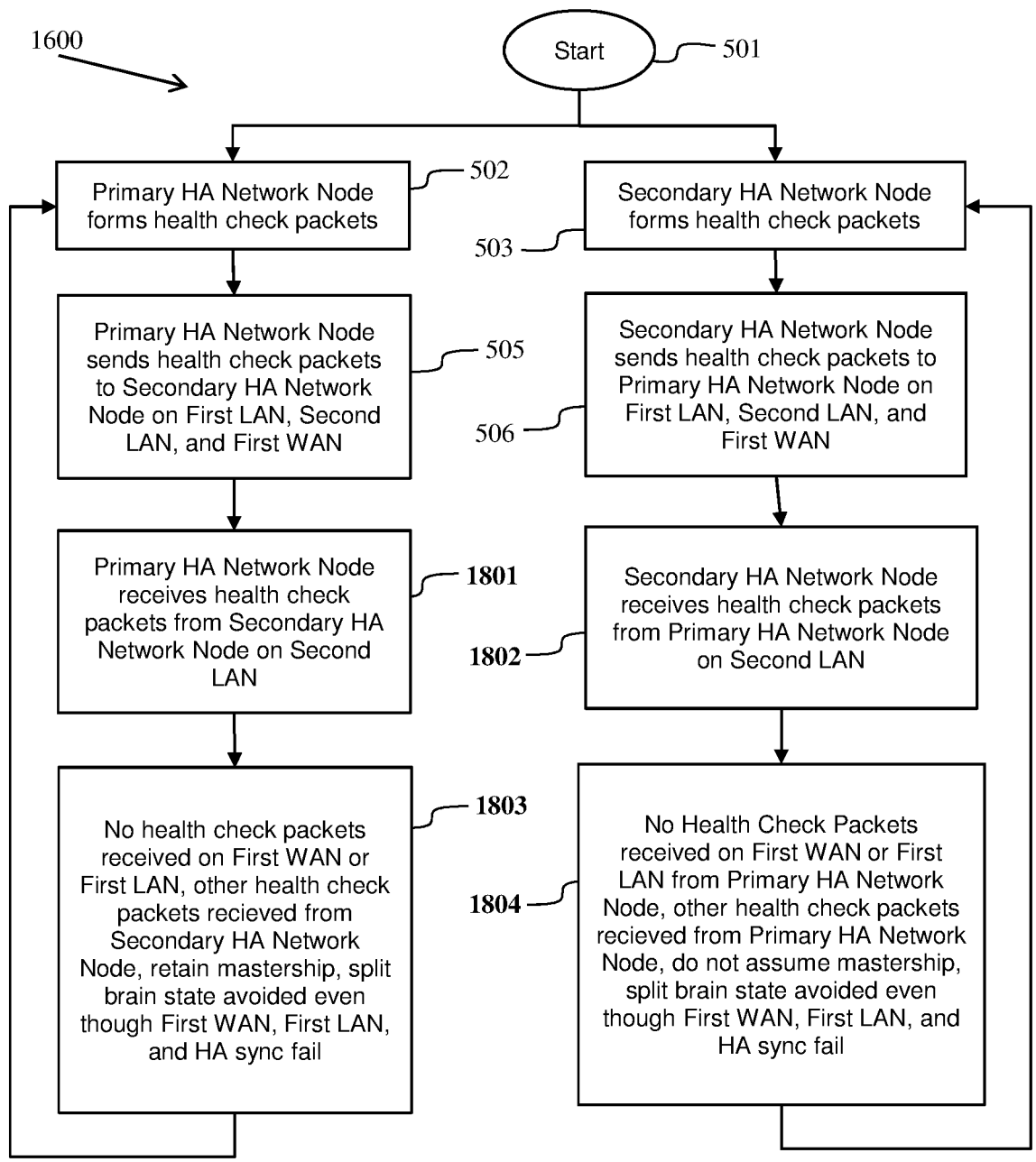
FIG. 18 illustrates the method of FIG. 5 avoiding a split-brain state in relation to the network of FIG. 17, according to embodiments herein.

FIG. 18 illustrates the method of FIG. 5 avoiding a split-brain state in relation to the network of FIG. 17, according to embodiments herein. Method steps 501, 502, 503, 505, and 506 are unchanged from those of FIG. 5. The HA network nodes receive health check packets only on the second LAN 1801, 1802. A split-brain state is avoided because health check packets are received by both HA network nodes 1803, 1804. The secondary HA network node does not assume mastership and does not become the active HA network node.

Figure 19:
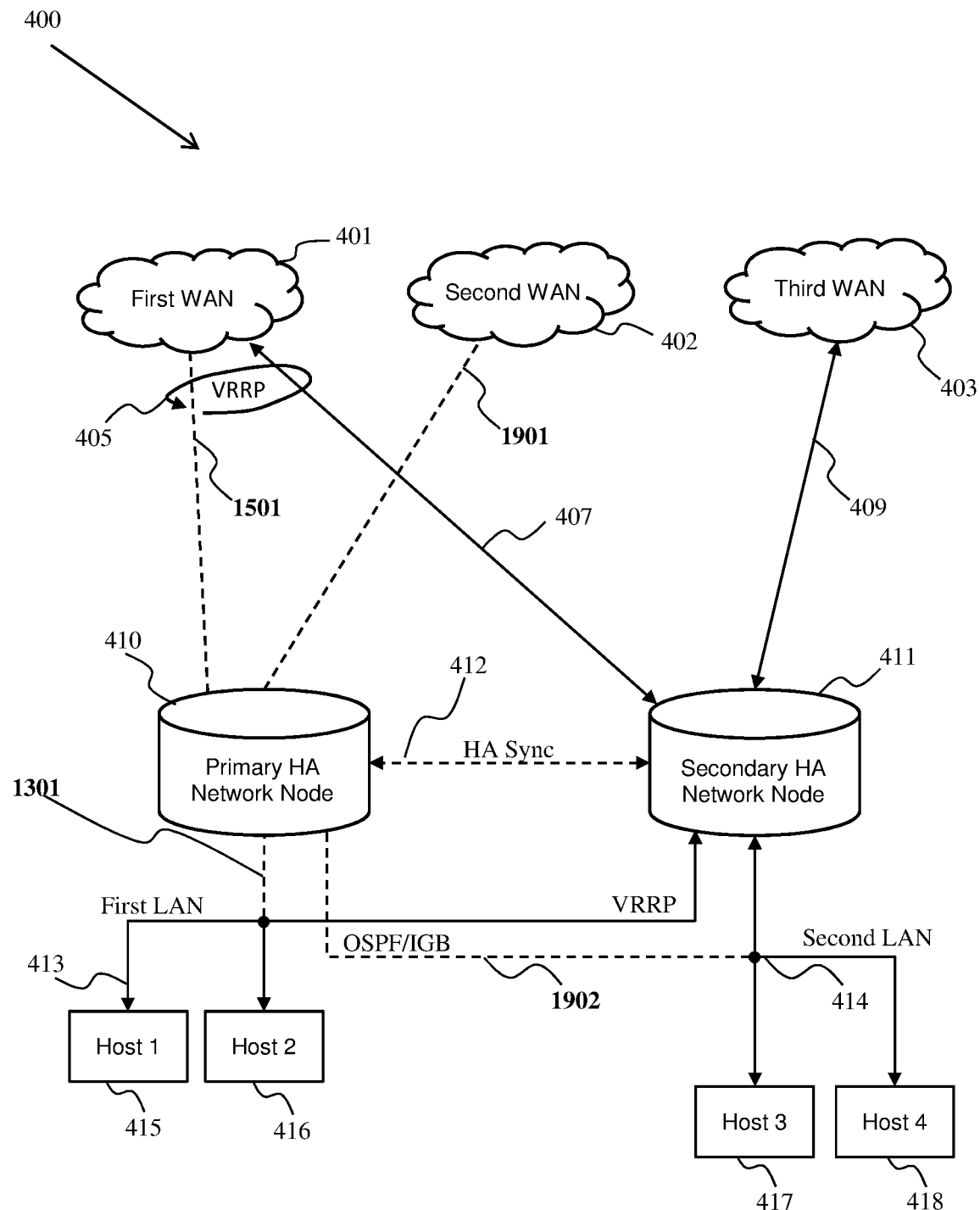
FIG. 19 illustrates the network of FIG. 4 with link failures wherein the primary HA network node is unable to transmit to the first WAN, the first LAN, or the second LAN, according to embodiments herein.

FIG. 19 illustrates the network of FIG. 4 with link failures 1301, 1501, 1901, 1902 wherein the primary HA network node is unable to transmit to the first WAN, the second WAN, the first LAN, or the second LAN, according to embodiments herein. The link failures 1301, 1501, 1901, 1902 are shown as dashed lines to the primary HA network node. If the periodic health-check probes are missing over all the available paths between the HA-pair, then it is indicative that either Active (currently the primary HA network node) has died or it is in a state where it cannot service the traffic over any available LAN segments, thereby necessitating a mastership change to the Standby node (currently the secondary HA network node) of the HA pair. Though split-brain happens in this scenario, it does not have any impact on the network services or performance because the primary HA network node, which may believe it has mastership, is completely isolated from the rest of the network. A similar split-brain would happen if the Standby node of the HA pair disconnected over all network paths available between the HA pair and assumed mastership. In which case also, since the Standby node is completely isolated from the rest of the network, it does not have any network service or performance impact.

Figure 20:
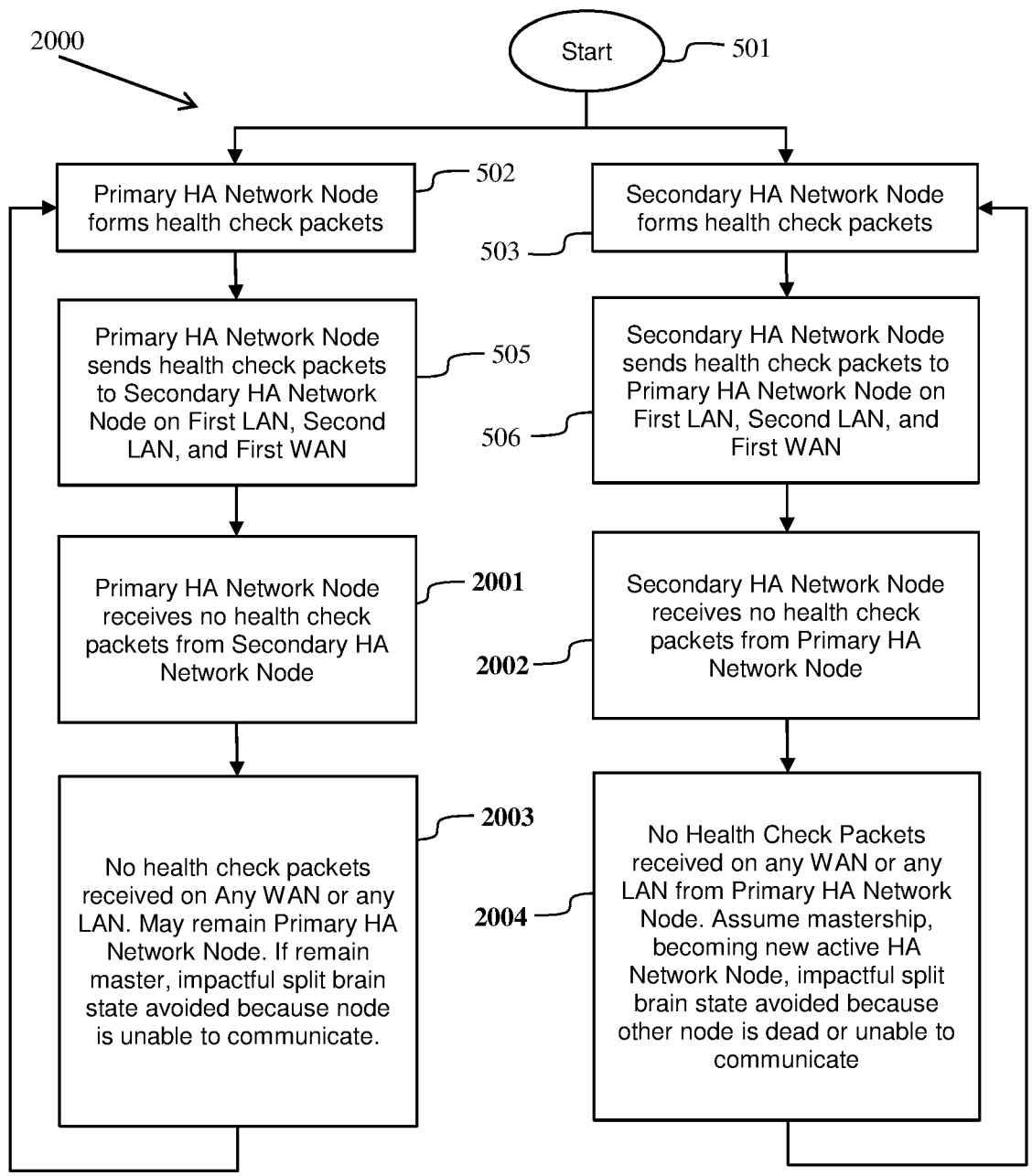
FIG. 20 illustrates the method of FIG. 5 avoiding an impactful split-brain state in relation to the network of FIG. 19, according to embodiments herein.

FIG. 20 illustrates the method of FIG. 5 avoiding an impactful split-brain state in relation to the network of FIG. 19, according to embodiments herein. Method steps 501, 502, 503, 505, and 506 are unchanged from those of FIG. 5. The HA network nodes receive no health check packets 2001, 2002. An impactful split-brain state is avoided 2003, 2004. Although there may be two active HA network nodes, there is no impact because the primary HA network node 410 cannot communicate on the first WAN 401, first LAN 413, or second LAN 414. The secondary HA network node can assume mastership and can become the active HA network node.

Figure 21:
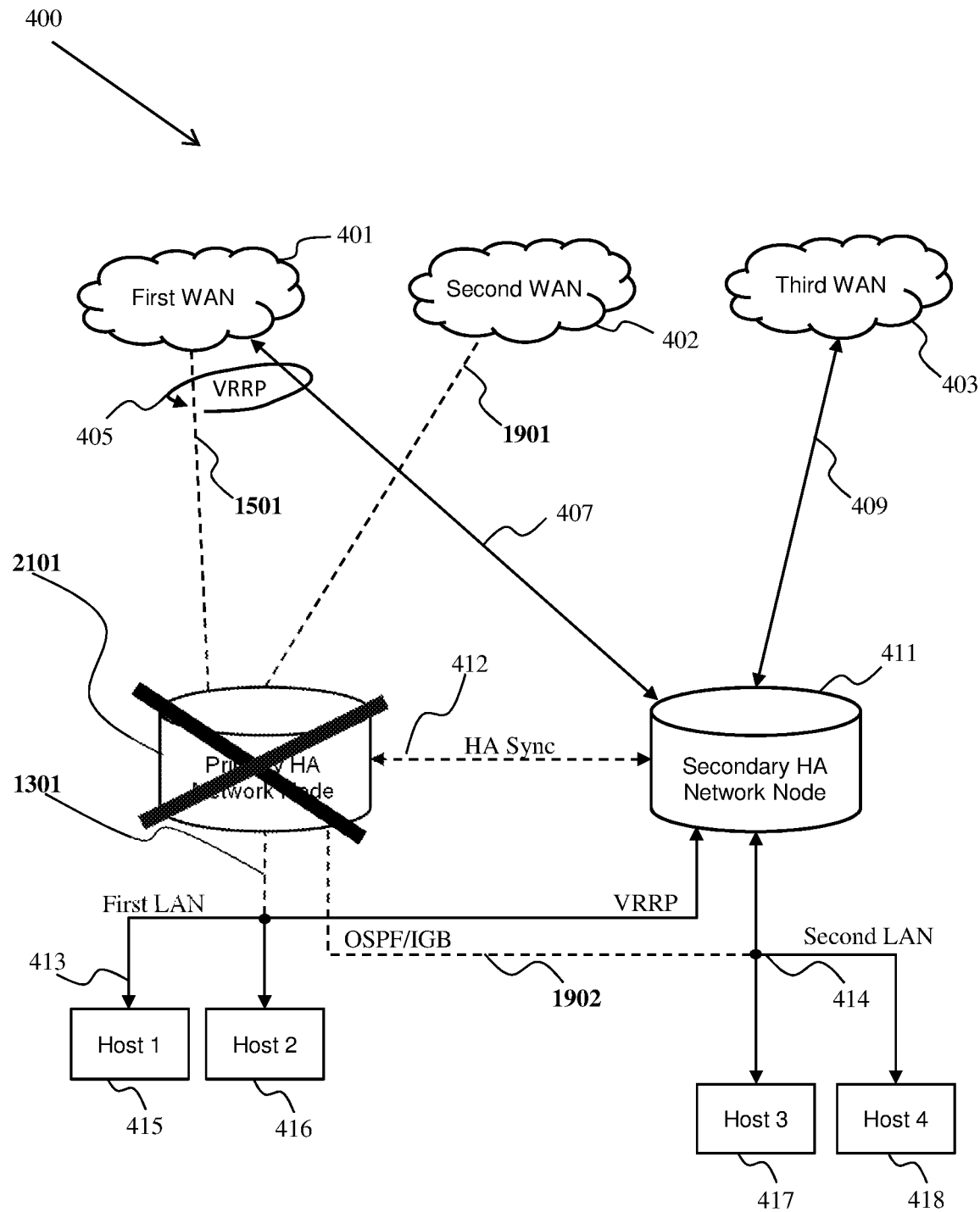
FIG. 21 illustrates the network of FIG. 4 with the primary HA network node down, according to embodiments herein.

FIG. 21 illustrates the network of FIG. 4 with the primary HA network node down 2101, according to embodiments herein. The link failures 1301, 1501, 1901, 1902 are due to the primary HA network node being down. The failure of critical services on a given HA node can lead to the restart of the given network node in the HA pair by way of a services watchdog. The failure of services results in the periodic health-check probes not being sent over any of the available paths between HA-pair, thereby necessitating the Standby node of HA pair to take over the mastership to provide continuity of services. The split-brain is avoided as the old Active node is confirmed to be not servicing the network.

Figure 22:
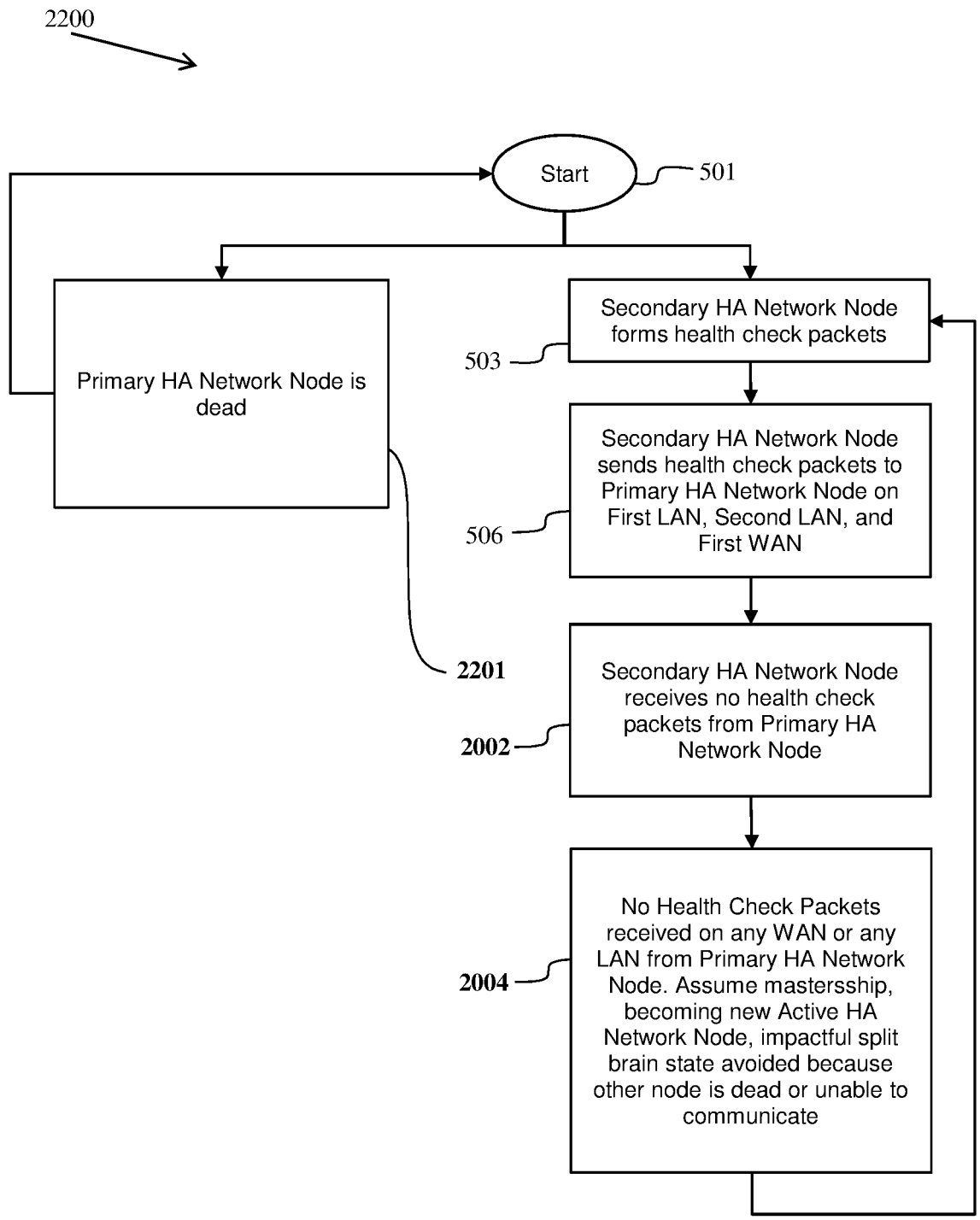
FIG. 22 illustrates the method of FIG. 5 avoiding a split-brain state in relation to the network of FIG. 21, according to embodiments herein.

FIG. 22 illustrates the method of FIG. 5 avoiding a split-brain state in relation to the network of FIG. 21, according to embodiments herein. Method steps 501, 503, 506, 2002, and 2004 are unchanged from those of FIG. 20. The HA network nodes receive no health check packets 2001, 2002 because the primary HA network node is down 2201 (e.g. all critical services are down) and does receive or send health check packets. The primary HA network node having died 2201, the method for it can loop back to the start 501 such that the critical services may be restarted. A split-brain state is avoided 2004 because there is only one working HA network node. The secondary HA network node can assume mastership and can become the active HA network node.

Figure 23:
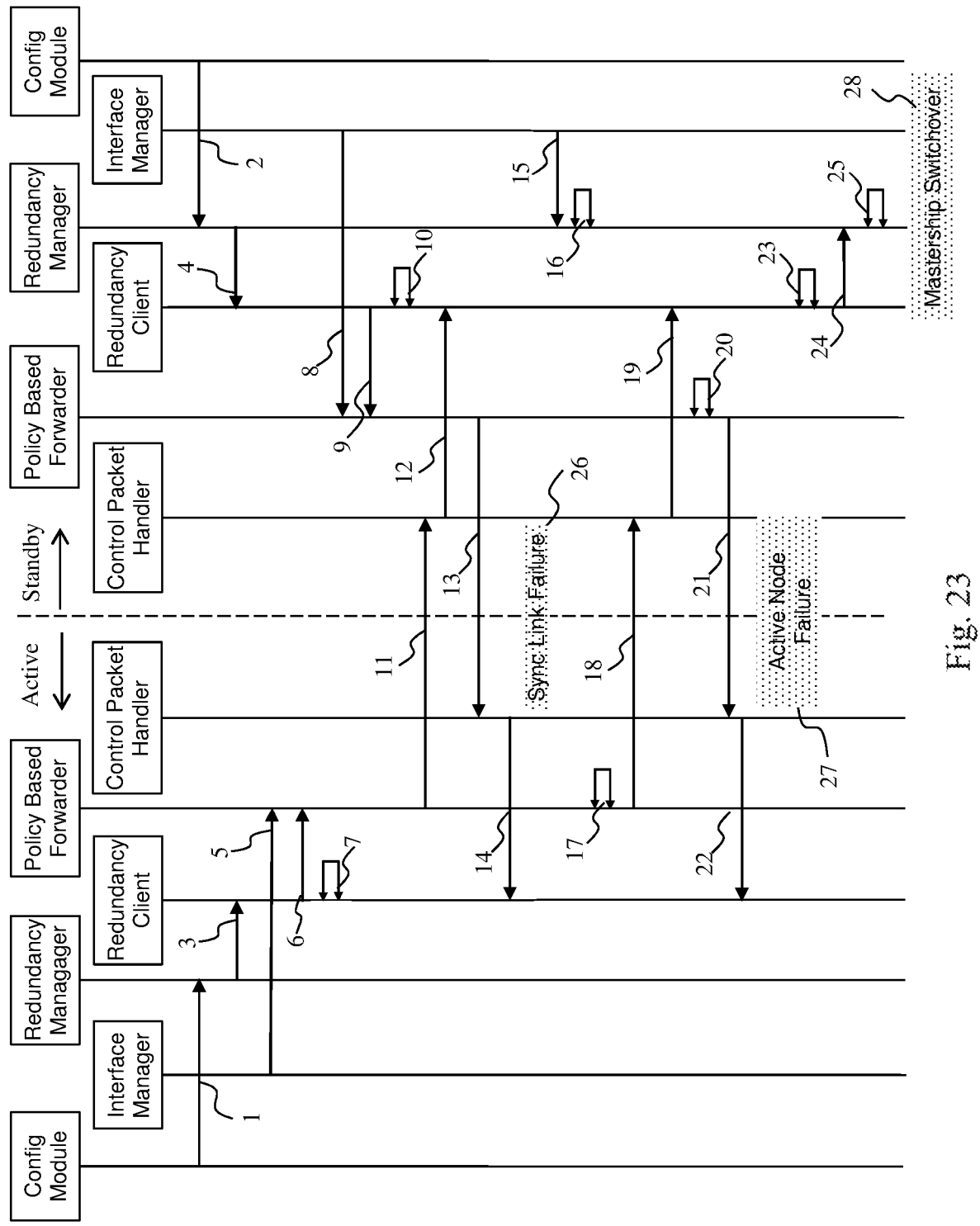
FIG. 23 illustrates messaging between sub-secondary HA network nodes avoiding a split-brain state, according to embodiments herein.

FIG. 23 illustrates messaging between sub-secondary HA network nodes avoiding a split-brain state, according to embodiments herein. Prior to the messaging, a number of probes are configured. On the primary HA network node (currently Active), a probe can be configured for every interface on which the secondary HA network node (currently Standby) can be reached. On Standby, a probe can be configured for every interface on which Active can be reached. Each of these probes can be repeatedly instantiated as network health packets. The messages before link failure 26 that are shown in the figure are:

1. Active's configuration module informs Active's redundancy manager of Active's configured probes.
2. Standby's configuration module informs Standby's redundancy manager of Standby's configured probes.
3. Active's redundancy manager informs Active's redundancy client about the probes to be instantiated and current node health status.
4. Standby's redundancy manager informs Standby's redundancy client about the probes to be instantiated and current node health status.
5. Active's interface manager informs Active's policy-based forwarder about which interfaces are up and available.
6. Active's redundancy client instantiates probes at a configured interval, based on interface availability. (Active produces health check packets).
7. Active starts a Standby-to-Active probe miss timer(s). There can be one timer for each of Standby's interfaces. Each Timer restarts on health check packet receipt.
8. Standby's interface manager informs Standby's policy-based forwarder about which interfaces are up and available.
9. Standby's redundancy client instantiates probes at a configured interval, based on interface availability. (Standby produces health check packets).
10. Standby starts an Active-to-Standby probe miss timer(s). There can be one timer for each of Actives's interfaces. Each Timer restarts on health check packet receipt.
11. Active's policy-based forwarder periodically sends Active's health check packets to Standby.
12. Standby's control packet handler successfully receives packets (including health check packets), identifies the health check packets from Active, and records peer health status.
13. Standby's policy-based forwarder periodically sends Standby's health check packets to Active.
14. Active's control packet handler successfully receives packets (including health check packets), identifies the health check packets from Standby (e.g. by examining vendor specific Id. Information), and records peer health status.

Active and Standby continue to exchange health check packets until a link failure 26 occurs. The messages after link failure 26 and before active link failure 27 shown in FIG. 23 are:

15. Standby's interface manager informs Standby's redundancy manager about the link/sync failure (Active-to-Standby probe miss timer timed out).
16. Standby's redundancy manager gathers health status and determines whether Active is down. If probes received on some interfaces but not others, can remain as Standby, thereby avoiding split-brain state.
17. After configured time interval after link/sync failure, Active's policy-based forwarder begins sending health check packets on remaining links.
18. Active's policy-based forwarder periodically sends Active's health check packets to Standby on all remaining links.
19. Standby's control packet handler receives packets, identifies the health check packets from Active, and records peer health status.
20. After configured time interval after link/sync failure, Standby's policy-based forwarder begins sending health check packets on remaining links.
21. Standby's policy-based forwarder periodically sends Standby's health check packets to Active on all remaining links.
22. Active's control packet handler receives packets, identifies the health check packets from Standby, and records peer health status.

Active and Standby continue to exchange health check packets until active node failure 27 occurs (the primary HA network node, currently Active, goes down). The messages after the active goes down are:

23. Standby's redundancy client notices that the Active-to-Standby probe-miss tracker timer finds probes missing on all paths for last X seconds (X is a configured value). (e.g. all Active-to-Standby probe miss timers timed out).

24. Standby's redundancy client informs Standby's redundancy manager that all probes were missed for X seconds (no health check packets will be sent).
25. With all probes down, Standby's redundancy manager determines that Active is not servicing any traffic in the network. So, take over the Mastership and become Active 28.

The methods described herein provide for periodic exchange of node and service health parameters among the HA pair nodes. These health-parameters allow the HA Standby node to continuously evaluate the ability of the current Active node to provide continued network services without any degradation in performance or availability in the event of non-critical services failure or hardware resource exhaustion. The information exchanged as part of service and node health parameters can include:

1. The state of non-critical services: Allows a user to define policies to tie network services important for business to the decision making of whether a node can continue to service a network when certain services important for business are having problems.
2. Hardware resource usage: Allows user policies to determine the action to take when the Active node has critically run out of system resources such that it can impact the stability of network services rendered by the given node.
3. Any other node or service property that can play a role in determining the ability of the current node to deliver network services as the Active HA node.

The methods described herein provide for periodic exchange of network and link health parameters among the HA pair nodes. These health-parameters allow the HA Standby node to continuously evaluate the ability of the current Active node to provide continued network services without any degradation in performance or availability in the event of network path unavailability or instability with a given interface and/or link. The information exchanged as part of network and link health parameters can include:

1. Per interface state information: Allows a user to define policies to tie particular interfaces on a network element, for instance WAN transport that is critical for given node, to decision making for providing continued network services.
2. The number of interfaces currently up and servicing the network: Allows user to define policies to tie the minimum number of interfaces that need to be operational on the network element to decision making for providing continued network services.
3. Per route state information: Allows user to define policies to tie a particular route on a network element, for instance a WAN route that is critical for a given node, to decision making for providing continued network services.
4. The number of routes currently up on the node: Allows a user to define policies to tie the minimum number of routes that need to be operational on the network element to decision making for providing continued network services.
5. The latency, latency variance (jitter), and other performance metrics for different paths or links: Allows a user to define policies to tie the acceptable threshold of performance metrics that should be met on the network element to decision making for providing continued network services.
6. Any other network, link, or path properties that can play a role in determining the ability of the current node to deliver network services as Active HA node.

The primary HA network node and the secondary HA network node are devices that can assume roles such as "active" and "standby". The "active HA node" is occasionally referred to as "Active" and is the device currently having the "active" role. The "standby HA node" is occasionally referred to as "Standby" and is the device currently having the "standby" role. Standby may become Active by assuming mastership. A split-brain state occurs when the primary HA network node and the secondary HA network node have both assumed mastership thereby assuming the "active" role.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for avoiding a split-brain state for a primary high availability (HA) network node and a secondary HA network node, the method comprising:
the primary HA network node and the secondary HA network node forming a plurality of health check packets, the primary HA network node and the secondary HA network node providing redundant connectivity between a wide area network (WAN) and a local area network (LAN) and cooperatively running a redundancy protocol such that the secondary HA network node takes over mastership when the primary HA network node fails; and
sending the health check packets on each of a plurality of routes, the routes comprising a route from the primary HA network node to the secondary HA network node that traverses the WAN, a route from the secondary HA network node to the primary HA network node that traverses the WAN, a route from the primary HA network node to the secondary HA network node that traverses the LAN, and a route from the secondary HA network node to the primary HA network node that traverses the LAN,
wherein
the health check packets include a health check overload data field and a frame check sequence section,
the health check packets are Internet Control Message Protocol (ICMP) packets or are Bi-Directional Forwarding Detection (BFD) protocol packets,
the ICMP packets include the health check overload data field between an ICMP data section and the frame check sequence section, and
the BFD protocol packets include the health check overload data field between a BFD data section and the frame check sequence section, and
based on which of health check packets are successfully received, the primary HA network node and the secondary HA network node do not enter the split-brain state.

2. The method of claim 1 wherein the health check overload data field includes a vendor specific identifier.

3. The method of claim 1 wherein the health check overload data field includes a critical service health metric.

4. The method of claim 1 wherein the health check overload data field includes a hardware resource health metric.

5. The method of claim 1 wherein the health check packets comprise overload data, the overload data comprising a critical service health metric, a hardware resource health metric, a non-critical service health metric, a critical interface health metric, a critical route health metric, and a plurality of values, the values indicating a number of interfaces that are up, a number of routes that are up, a latency of a critical path, a jitter of the critical path, and a bandwidth of the critical path.

6. A computer readable medium storing computer readable instructions, that when executed on one or more processors, implements a method for avoiding a split-brain state for a primary high availability (HA) network node and a secondary HA network node, the method comprising:
the primary HA network node and the secondary HA network node forming a plurality of health check packets, the primary HA network node and the secondary HA network node providing redundant connectivity between a wide area network (WAN) and a local area network (LAN) and cooperatively running a redundancy protocol such that the secondary HA network node takes over mastership when the primary HA network node fails; and
sending the health check packets on each of a plurality of routes, the plurality of routes, the routes comprising a route from the primary HA network node to the secondary HA network node that traverses the WAN, a route from the secondary HA network node to the primary HA network node that traverses the WAN, a route from the primary HA network node to the secondary HA network node that traverses the LAN, and a route from the secondary HA network node to the primary HA network node that traverses the LAN,
wherein
the health check packets include a health check overload data field and a frame check sequence section,
the health check packets are Internet Control Message Protocol (ICMP) packets or are Bi-Directional Forwarding Detection (BFD) protocol packets,
the ICMP packets include the health check overload data field between an ICMP data section and the frame check sequence section,
the BFD protocol packets include the health check overload data field between a BFD data section and the frame check sequence section, and
based on which of health check packets are successfully received, the primary HA network node and the secondary HA network node do not enter the split-brain state.

7. The computer readable medium of claim 6, wherein the health check packets comprise overload data, the overload data comprising a plurality of values, the values indicating a number of interfaces that are up, a number of routes that are up, a latency of a critical path, a jitter of the critical path, and a bandwidth of the critical path.

8. The computer readable medium of claim 6, wherein the health check packets are packets of a protocol that supports inter-operable overload.

9. A method implemented by a primary high availability (HA) network node and a secondary HA network node, the method comprising:
running a redundancy protocol such that the secondary HA network node takes over mastership when the primary HA network node fails;
forming a plurality of health check packets that each include a health check overload data field and a frame check sequence section;
sending, by the primary HA network node, a first plurality of the health check packets over a wide area network (WAN) to the secondary HA node;
sending, by the secondary HA network node, a second plurality of the health check packets over the WAN to the primary HA node;
sending, by the primary HA network node, a third plurality of the health check packets over a local area network (LAN) to the secondary HA node; and
sending, by the secondary HA network node, a fourth plurality of the health check packets over the LAN to the primary HA node,
wherein
the primary HA network node and the secondary HA network node are connected directly to the LAN,
the health check packets are Internet Control Message Protocol (ICMP) packets or are Bi-Directional Forwarding Detection (BFD) protocol packets, the ICMP packets include the health check overload data field between an ICMP data section and the frame check sequence section, the BFD protocol packets include the health check overload data field between a BFD data section and the frame check sequence section, and based on which of health check packets are successfully received, the HA network nodes do not enter a split-brain state.

10. The method of claim 9 further including:

sending, by the primary HA network node, a fifth plurality of the health check packets over a second LAN to the secondary HA node; and sending, by the secondary HA network node, a sixth plurality of the health check packets over the second LAN to the primary HA node, wherein the primary HA network node and the secondary HA network node are connected directly to the second LAN.

11. The method of claim 10, wherein the primary HA network node and the secondary HA network node provide redundant connectivity between the WAN and the LAN and the second LAN.

12. The method of claim 10, wherein:

the primary HA network node is connected to a second WAN; and the primary HA network node and the secondary HA network node further providing redundant connectivity between the LAN, the second LAN, the WAN and the second WAN.

\* \* \* \* \*